(12) United States Patent
Ishihara

(10) Patent No.: US 7,256,917 B2
(45) Date of Patent: Aug. 14, 2007

(54) TWO-DIMENSIONAL SCANNING APPARATUS AND SCANNING TYPE IMAGE DISPLAYING APPARATUS USING THE SAME

(75) Inventor: Keiichiro Ishihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 10/991,376

(22) Filed: Nov. 19, 2004

(65) Prior Publication Data

US 2005/0117188 A1 Jun. 2, 2005

(30) Foreign Application Priority Data

Nov. 27, 2003 (JP) ............................. 2003-397677

(51) Int. Cl.
*G02B 26/08* (2006.01)
(52) U.S. Cl. ..................................... 359/207
(58) Field of Classification Search ................. 359/207
See application file for complete search history.

(56) References Cited

U.S. PATENT DOCUMENTS

| 6,064,504 | A  | * | 5/2000 | Minakuchi et al. ......... 359/206 |
|---|---|---|---|---|
| 6,185,029 | B1 |   | 2/2001 | Ishihara ....................... 359/216 |
| 6,665,103 | B2 |   | 12/2003 | Ishihara ....................... 359/205 |
| 6,683,707 | B2 |   | 1/2004 | Ishihara et al. .............. 359/205 |
| 6,700,596 | B2 |   | 3/2004 | Ishihara ....................... 347/134 |
| 6,774,924 | B2 |   | 8/2004 | Kato et al. ................... 347/244 |
| 6,775,042 | B2 |   | 8/2004 | Ishihara ....................... 359/212 |
| 6,795,224 | B2 |   | 9/2004 | Ishihara ....................... 359/205 |
| 6,803,942 | B2 |   | 10/2004 | Sato et al. ................... 347/259 |
| 6,831,764 | B2 |   | 12/2004 | Shimomura et al. ........ 359/207 |
| 2003/0001944 | A1 |   | 1/2003 | Yoshida et al. .............. 347/241 |
| 2004/0027446 | A1 |   | 2/2004 | Kato et al. ................... 347/228 |
| 2004/0104994 | A1 |   | 6/2004 | Ishihara et al. .............. 347/258 |
| 2004/0233495 | A1 |   | 11/2004 | Ishihara ....................... 359/212 |

FOREIGN PATENT DOCUMENTS

| JP | 8-146320 | 6/1996 |
|---|---|---|
| JP | 11-84291 | 3/1999 |

* cited by examiner

*Primary Examiner*—Euncha P. Cherry
(74) *Attorney, Agent, or Firm*—Fitzpatrick, Cella, Harper & Scinto

(57) ABSTRACT

A two-dimensional scanning apparatus has light source means, deflecting means for deflecting a beam emitted from the light source means in a two-dimensional direction, and scanning optical means for directing the beam deflected by the deflecting means onto a surface to be scanned. The scanning optical means has one or more scanning optical element, and one or more surfaces of one or more of the aforementioned one or more scanning optical elements are anamorphic surfaces, and the anamorphic surfaces on the aforementioned one or more surfaces are anamorphic surfaces monotonously changing in a radius of curvature of which the absolute value of the radius of curvature in a first one-dimensional direction continuously decreases from one side toward the other side along a second one-dimensional direction orthogonal to the first one-dimensional direction. Thus, there can be supplied a two-dimensional scanning apparatus which can well correct TV distortion caused by the two-dimensional deflection of the beam by the deflecting means and trapezoid distortion caused by an image being obliquely projected onto a surface to be scanned, and a scanning type image displaying apparatus using the same.

10 Claims, 14 Drawing Sheets

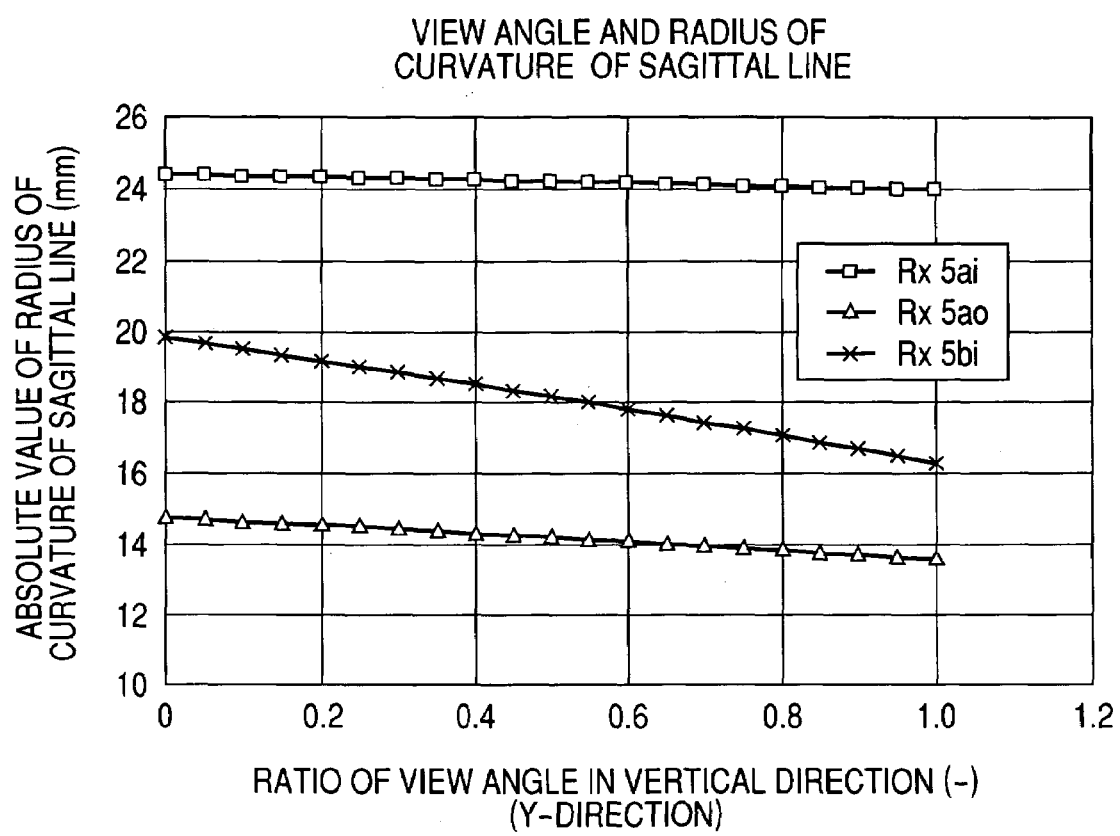

POSITION OF MERIDIAN LINE AND RADIUS OF CURVATURE OF SAGITTAL LINE

TWO-DIMENSIONAL SCANNING APPARATUS AND SCANNING TYPE IMAGE DISPLAYING APPARATUS USING THE SAME

BACKGROUND OF THE INVENTION

1. Field of the Invention

This invention relates to a two-dimensional scanning apparatus and a scanning type image displaying apparatus using the same, and particularly is adapted to two-dimensionally scan a beam (deflected beam) deflected by deflecting means to thereby project and display a two-dimensional image on a surface to be scanned (a screen surface).

2. Related Background Art

There have heretofore been various two-dimensional scanning apparatuses adapted to two-dimensionally deflect a beam emitted from light source means by deflecting means, and two-dimensionally optically scan a surface to be scanned with a spot to thereby form a two-dimensional image (see, for example, Japanese Patent Application Laid-Open No. H08-146320).

In Japanese Patent Application Laid-Open No. H08-146320, a beam emitted from light source means is deflected by deflecting means capable of two-dimensional deflection, and a surface to be scanned is two-dimensionally scanned with the beam by a scanning lens of which the distortion characteristic has an f·sinθ characteristic. In this publication, the distortion of an image is corrected by the f·sinθ characteristic of the scanning lens and electrical correction.

In Japanese Patent Application Laid-Open No. H11-84291, there is disclosed a two-dimensional scanning optical system using an optical element including a refracting surface and a reflecting surface, and turning back an optical path in the interior of the optical element, and in order to correct eccentric aberration, the refracting surface or the reflecting surface is constituted by a non-rotation symmetrical surface having an axis of rotational symmetry in neither the inside nor the outside of the surface. In this publication, although adopting a two-dimensional scanning optical system constituted by an optical element, the speed constancy of scanning beam on a surface to be scanned is corrected well over a wide scanning angle. It is also made possible to achieve telecentricity necessary for highly accurate image depiction.

As previously described, the two-dimensional scanning apparatus deflects a beam emitted from light source means by deflecting means capable of two-dimensional deflection, and forms a two-dimensional image on a surface to be scanned through a two-dimensional scanning optical system. It is generally known that at this time, image distortion occurs to the two-dimensional scanning image on the surface to be scanned. This is the so-called distortion.

The distortion includes distortion as the distortion of a two-dimensional scanning optical system, the distortion of a constant speed scanning property, TV distortion which indicates that the frame of an image depicted on a surface to be scanned curves, and the like. Also, when an image is obliquely projected onto the surface to be scanned, trapezoid distortion occurs.

In Japanese Patent Application Laid-Open No. H08-146320, TV distortion is corrected by the f·sinθ characteristic of the scanning optical system and electrical correction, however there has been the problem that it is difficult to electrically correct it.

In Japanese Patent Application Laid-Open No. H11-84291, it is also made possible to have a wide scanning angle, correct distortion of a constant speed scanning property and achieve telecentricity, however TV distortion caused by two-dimensional scanning cannot be corrected. In the publication, there has been the problem that when image distortion such as TV distortion and trapezoid distortion occurs, the quality of the image is deteriorated, so that an image of high quality cannot be displayed.

SUMMARY OF THE INVENTION

It is an object of the present invention to provide a two-dimensional scanning apparatus which can well correct the image distortion of a scanning image displayed by two-dimensionally optically scanning with a beam deflected by deflecting means. Particularly it is an object of the present invention to provide a two-dimensional scanning apparatus carrying thereon a two-dimensional scanning optical system which can well correct TV distortion caused by a beam being two-dimensionally deflected by deflecting means and trapezoid distortion caused by an image being obliquely projected onto a surface to be scanned, and capable of always displaying an image of high quality free of image distortion, and a scanning type image displaying apparatus using the same.

According to one aspect of the invention, there is provided a two-dimensional scanning apparatus having light source means, deflecting means for deflecting a beam emitted from the light source means in a two-dimensional direction, and scanning optical means for directing the beam deflected by the deflecting means onto a surface to be scanned, in which the scanning optical means has at least one scanning optical element, at least one of optical surfaces of the aforementioned at least one scanning optical element is an anamorphic surface, and the anamorphic surface is an anamorphic surface of which the absolute value of a radius of curvature in a first direction continuously decreases from one side to the other side along a second direction orthogonal to the first direction.

According to a further aspect of the invention, in the two-dimensional scanning apparatus, pf the beam deflected by the deflecting means, a beam traveling along the central view angle in the second direction is incident at a finite angle with respect to the surface to be scanned.

According to a further aspect of the invention, in the two-dimensional scanning apparatus, let θvi be an angle in the second direction at which every beam deflected by the deflecting means is incident on the surface to be scanned, θvi is 0 degree.

According to a further aspect of the invention, in the two-dimensional scanning apparatus, in the second direction, the angle at which a beam passed through a portion of the scanning optical element having the anamorphic surface in which the absolute value of the radius of curvature in the first direction is small is incident on the surface to be scanned is greater than the angle at which a beam passed through a portion thereof in which the absolute value of the radius of curvature is great is incident on the surface to be scanned.

According to a further aspect of the invention, in the two-dimensional scanning apparatus, one or more of the aforementioned at least one scanning optical element have a plurality of anamorphic surfaces monotonously changing in the radius of curvature, one or more of the plurality of anamorphic surfaces monotonously changing in the radius of curvature have positive refractive power, one or more of them have negative refractive power, and a side of the anamorphic surfaces monotonously changing in the radius of curvature having the positive refractive power on which the absolute value of the radius of curvature in the first direction is great and a side of the anamorphic surfaces monotonously changing in the radius of curvature having the negative refractive power on which the absolute value of the radius of curvature in the first direction is great are made coincident with each other.

According to a further aspect of the invention, in the two-dimensional scanning apparatus, the aforementioned at least one scanning optical element has a plurality of anamorphic surfaces, at least one of the plurality of anamorphic surfaces has positive refractive power, at least one of the plurality of anamorphic surfaces has negative refractive power, and a side of the anamorphic surface having the positive refractive power on which the absolute value of the radius of curvature in the first direction is small and a side of the anamorphic surface having the negative refractive power on which the absolute value of the radius of curvature in the first direction is small are made coincident with each other.

According to a further aspect of the invention, in the two-dimensional scanning apparatus, the aforementioned at least one scanning optical element is a meniscus lens having the anamorphic surface on the incidence surface or/and the emergence surface thereof, and having its concave surface facing the deflecting means side.

According to a further aspect of the invention, in the two-dimensional scanning apparatus, the aforementioned at least one scanning optical element has an anamorphic surface of which the absolute value of the radius of curvature in the second direction is greater than the absolute value of the radius of curvature in the first direction.

According to a further aspect of the invention, in the two-dimensional scanning apparatus, the aforementioned at least one scanning optical element has a barrel-shaped toric surface.

According to a further aspect of the invention, in the two-dimensional scanning apparatus, the aforementioned at least one scanning optical element has a surface centering around a meridian line and formed by being rotated about an axis parallel to the meridian line.

According to a further aspect of the invention, in the two-dimensional scanning apparatus, the aforementioned at least one scanning optical element is tilted in the second direction.

According to a further aspect of the invention, in the two-dimensional scanning apparatus, the aforementioned at least one scanning optical element is shifted in the second direction.

According to a further aspect of the invention, in the two-dimensional scanning apparatus, the scanning optical means is an anamorphic scanning optical system of which the refractive power is stronger in the first direction than in the second direction.

According to a further aspect of the invention, in the two-dimensional scanning apparatus, an anamorphic incidence optical system of which the refractive power is weaker in the first direction than in the second direction is disposed between the light source means and the deflecting means, and the beam emitted from the light source means is converted into a beam weaker in the degree of convergence in the first direction than in the second direction, or a beam stronger in the degree of divergence in the first direction than in the second direction.

According to a further aspect of the invention, in the two-dimensional scanning apparatus, the anamorphic incidence optical system has a cylindrical lens having negative refractive power in the first direction.

According to a further aspect of the invention, in the two-dimensional scanning apparatus, the anamorphic incidence optical system has an anamorphic lens having negative refractive power in the first direction and having positive refractive power in the second direction.

According to another aspect of the invention, there is provided a two-dimensional scanning apparatus having light source means, deflecting means for deflecting a beam emitted from the light source means in a two-dimensional direction, and scanning optical means for directing the beam deflected by the deflecting means onto a surface to be scanned, wherein the scanning optical means has at least one scanning optical element, and at least one of the optical surfaces of the aforementioned at least one scanning optical element is an anamorphic surface of which the absolute value of a local radius of curvature in a first direction in the peripheral portion in the first direction changes from one side toward the other side along a second direction orthogonal to the first direction.

According to a further aspect of the invention, in the two-dimensional scanning apparatus, at least one surface of the aforementioned at least one scanning optical element is an anamorphic surface, and the aforementioned at least one anamorphic surface is an anamorphic surface of which the absolute value of the radius of curvature in the first direction continuously decreases from one side toward the other side along the second direction.

According to another aspect of the invention, there is provided a two-dimensional scanning apparatus having light source means, deflecting means for deflecting a beam emitted from the light source means in a two-dimensional direction, and scanning optical means for directing the beam deflected by the deflecting means onto a surface to be scanned, wherein the deflecting means has a first deflector for deflecting the beam emitted from the light source means in a first direction, and a second deflector for deflecting the beam deflected by the first deflector in a second direction orthogonal to the first direction, an anamorphic incidence optical system weaker in refractive power in the first direction than in the second direction is disposed between the light source means and the first deflector or between the first deflector and the second deflector, and the anamorphic incidence optical system converts the beam emitted from the light source means into a beam weaker in the degree of convergence in the first direction than in the second direction, or a beam stronger in the degree of divergence in the first direction than in the second direction.

According to a further aspect of the invention, in the two-dimensional scanning apparatus, the scanning optical means is an anamorphic scanning optical system stronger in refractive power in the first direction than in the second direction.

According to a further aspect of the invention, in the two-dimensional scanning apparatus, the anamorphic incidence optical system has a cylindrical lens having negative refractive power in the first direction.

According to a further aspect of the invention, in the two-dimensional scanning apparatus, the anamorphic incidence optical system has an anamorphic lens having negative refractive power in the first direction and having positive refractive power in the second direction.

According to another aspect of the invention, there is provided a scanning type image displaying apparatus provided with the two-dimensional scanning apparatus set out in the foregoing.

According to another aspect of the invention, there is provided a scanning type color image displaying apparatus provided with light sources of three colors as light source means in the two-dimensional scanning apparatus set out in the foregoing.

BRIEF DESCRIPTION OF THE DRAWINGS

FIG. 8 shows the state of change in the radius of curvature of the sagittal line of a scanning lens in the first embodiment of the present invention.

DESCRIPTION OF THE PREFERRED EMBODIMENTS

According to the present invention, there can be achieved a two-dimensional scanning apparatus in which one or more surfaces of one or more of one or more scanning optical elements constituting scanning optical means (a two-dimensional scanning optical system) are formed by anamorphic surfaces, and the one or more anamorphic surfaces are made into anamorphic surfaces with radius of curvature monotonously changing, in which the absolute value of the radius of curvature in a first one-dimensional direction continuously decreases along with a second one-dimensional direction from one side toward the other side, whereby the image distortion of a scanning image displayed by a beam being two-dimensionally optically scanned by deflecting means can be corrected well.

Particularly there can be achieved a scanning type image displaying apparatus carrying thereon a two-dimensional scanning optical system which can well correct TV distortion caused by the beam being two-dimensionally deflected or trapezoid distortion caused by an image being obliquely projected onto a surface to be scanned, and capable of always displaying an image of high quality free of image distortion.

Some embodiments of the present invention will hereinafter be described with reference to the drawings.

First Embodiment

Figure 1:
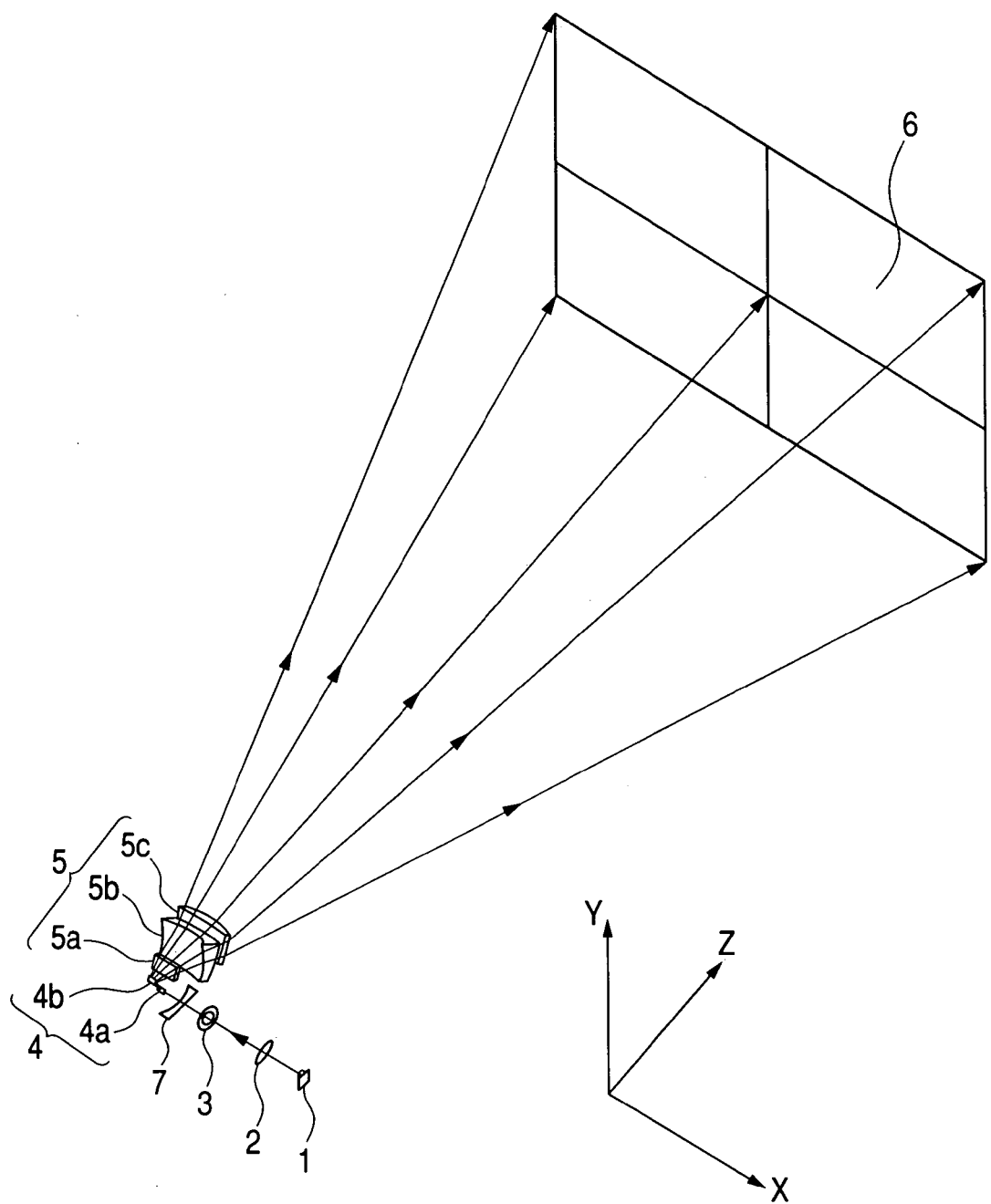
FIG. 1 is a perspective view of the essential portions of a two-dimensional scanning apparatus according to a first embodiment of the present invention.
Figure 2:
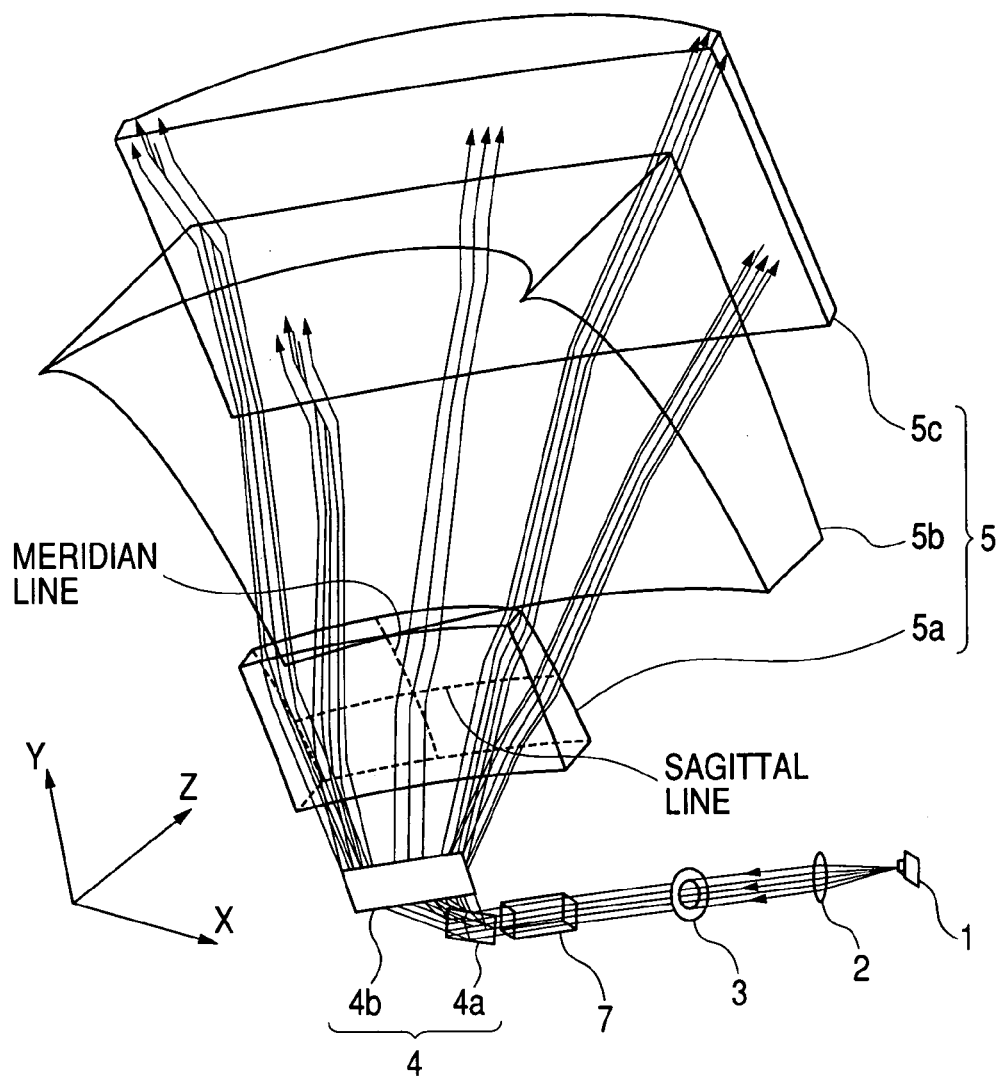
FIG. 2 is a schematic view of the essential portions of the first embodiment of the present invention.

FIG. 1 is a perspective view of the essential portions of a scanning type image displaying apparatus using a two-dimensional scanning apparatus according to a first embodiment of the present invention, and FIG. 2 is a schematic view of the essential portions of the first embodiment of the present invention.

In these figures, the reference numeral 1 designates light source means comprising, for example, a red semiconductor laser or the like.

The reference numeral 2 denotes a condensing lens (collimator lens) which converts a divergent beam emitted from the light source means 1 into a parallel beam (or a convergent beam or a divergent beam).

The reference numeral 3 designates an aperture stop which limits the passing beam to thereby shape the shape of the beam.

The reference numeral 7 denotes an anamorphic incidence optical system weaker in refractive power in a first one-dimensional direction (first direction) than that in a second one-dimensional direction (second direction), and disposed between the light source means 1 and a first deflector 4a. The anamorphic incidence optical system 7 may be disposed between the first deflector 4a and a second deflector 4b. The anamorphic incidence optical system 7 in the present embodiment comprises a cylindrical lens having negative refractive power (optical power) only in the first one-dimensional direction, and converts the beam emitted from the light source means 1 into a divergent beam only in the first one-dimensional direction, and causes the beam in the second one-dimensional direction to enter the first deflector as a parallel beam as it has been.

Herein, the first one-dimensional direction means a direction (X-axis direction or sagittal line direction) parallel to a scanning line (X-axis direction), and the second one-dimensional direction means a direction (Y-axis direction or meridian line direction) perpendicular to the scanning line (X-axis direction).

The reference numeral 4 designates deflecting means (two-dimensional deflecting means) having, for example, the first deflector 4a resonatable in a one-dimensional direction having a reflecting surface on a surface, and the second deflector (deflecting mirror) 4b deflectable at a uniform angular speed.

In the present embodiment, the beam emitted from the light source means 1 is deflected in a horizontal direction (X-axis direction) by the first deflector 4a, and the beam (deflected beam) from the first deflector 4a is deflected in a vertical direction (Y-axis direction) by the second deflector 4b, whereby the beam emitted from the light source means 1 is two-dimensionally deflected.

The reference numeral 5 denotes a two-dimensional scanning optical system as scanning optical means having three first, second and third scanning lenses 5a, 5b and 5c as scanning optical elements, and comprised of an anamorphic scanning optical system stronger in optical power in the horizontal direction (X-axis direction) than in the vertical direction (Y-axis direction), and it causes the beam two-dimensionally deflected by the deflecting means 4 to be imaged as a spot on a screen surface 6 serving as a surface to be scanned.

In the present embodiment, of the three first, second and third scanning lenses 5a, 5b and 5c, the incidence surface 5ai and emergence surface 5ao of the first scanning lens 5a and the incidence surface 5bi of the second scanning lens 5b are configured by anamorphic surfaces of which the absolute value of the radius of curvature in the vertical direction (Y-axis direction) is greater than the absolute value of the radius of curvature in the horizontal direction (X-axis direction). Also, these anamorphic surfaces are formed by anamorphic surfaces with radius of curvature monotonously changing, of which the absolute value of the radius of curvature in the horizontal direction (X-axis direction) continuously decreases along with the vertical direction (Y-axis direction) from one side toward the other side. Also, the first and second scanning lenses 5a and 5b having the anamorphic surfaces with radius of curvature monotonously changing comprise meniscus lenses having their concave surfaces facing the deflecting means 4 side.

The reference numeral 6 designates a screen surface as a surface to be scanned.

In the present embodiment, the divergent beam emitted from the light source means 1 is converted into a parallel beam by the condensing lens 2, and has its beam width limited by the aperture stop 3. The beam passed through the aperture stop 3 is converted into a divergent beam only in the horizontal direction by the anamorphic incidence optical system 7. The converted beam is deflected in the horizontal direction (X-axis direction) by the first deflector 4a, and is further deflected in the vertical direction (Y-axis direction) by the second deflector 4b, thus being two-dimensionally deflected.

Then, the beam two-dimensionally deflected by the deflecting means 4 is directed onto the screen surface 6 through the two-dimensional scanning optical system 5, and the screen surface 6 is two-dimensionally optically scanned with the beam. As described above, the beam is optically scanned at a high speed in the horizontal direction by the first deflector 4a to thereby depict a scanning line, and is optically scanned at a low speed in the vertical direction by the second deflector 4b to thereby display a two-dimensional image on the screen surface 6.

In the present embodiment, as the first deflector 4a, use is made of an MEMS device (MEMS mirror) produced by MEMS (Micro Electro Mechanical Systems) technique or the like.

Figure 3:
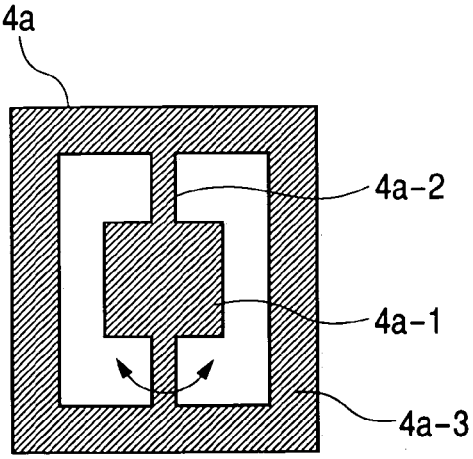
FIG. 3 is a schematic view of the essential portions of an MEMS device.

FIG. 3 shows a schematic view of the essential portions of the MEMS device.

In FIG. 3, the reference character 4a designates the MEMS device as the first deflector. The reflecting surface 4a-1 thereof is supported on a housing 4a-3 by a torsion bar 4a-2, and a magnet provided on the back of the reflecting surface 4a-1 reacts to a magnetic force generated by a coil, not shown, and vibrates in a one-dimensional direction. The direction of the MEMS device 4a is adjusted so that the beam may be deflected in the horizontal direction by this vibration.

Also, as the second deflector 4b, use is made of a plane mirror (deflecting mirror) mounted on a stepping motor displaced at a uniform angular speed. In the present embodiment, the MEMS device 4a which is the first deflector and the deflecting mirror 4b which is the second deflector are disposed in proximity to each other, and the interval therebetween is 7.0 (mm).

It is desirable that the scanning image depicted on the screen surface 6 by the two-dimensional scanning apparatus be displayed as per an inputted image signal. In the two-dimensional scanning apparatus, however, TV distortion occurs in addition to the distortion of the two-dimensional scanning optical system 5 and distortion of a constant speed property, and image distortion occurs from a desired shape given by the image signal and deteriorates the quality of the scanning image, and this has posed a problem. Particularly the TV distortion attributable to two-dimensional scanning causes to display a frame line, which usually ought to be of a rectangular shape or a grating-shaped image, curved, and has remarkably deteriorated the quality of the image.

Also, the two-dimensional scanning-apparatus according to the present embodiment displays the scanning image on the screen surface 6 by an oblique projecting method.

Figure 4:
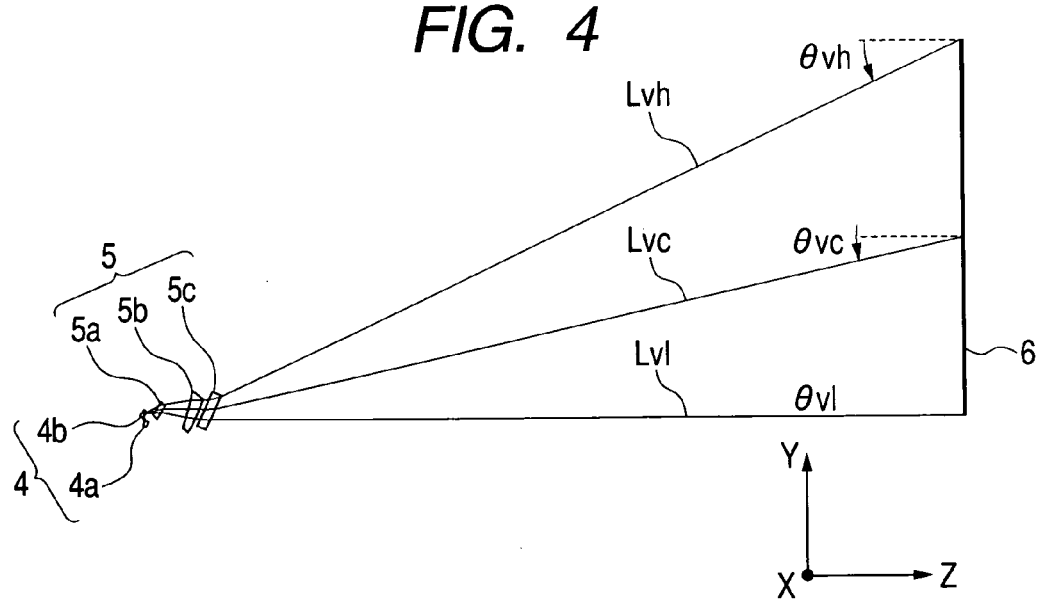
FIG. 4 is a schematic view of the two-dimensional scanning apparatus according to the first embodiment of the present invention in a vertical direction.

FIG. 4 is a schematic view (vertical cross-sectional view) of the essential portions of the two-dimensional scanning apparatus according to the present embodiment in the vertical direction (Y-axis direction).

As shown in FIG. 4, the screen surface 6 is optically scanned with the beam deflected by the first deflector 4a and the second deflector 4b through the two-dimensional optical system 5. At this time, a beam Lvc traveling along the central view angle in the vertical direction (Y-axis direction) is incident on the screen surface at a finite angle θvc (≠0 deg.). Particularly all the beams have an incident angle θvi on the screen surface 6 in the vertical direction as θvi≧0 deg.

Thus, by the oblique projecting method, the scanning image displayed on the screen surface 6 is upwardly shifted and the scanning image is disposed so as to be easily seen to an observer. In FIG. 4, Lvh designates a beam traveling along a maximum view angle, and Lvl denotes a beam traveling along a minimum view angle.

The three first, second and third scanning lenses 5a, 5b and 5c constituting the two-dimensional scanning optical system 5 will now be described with reference to FIG. 5.

Figure 5:
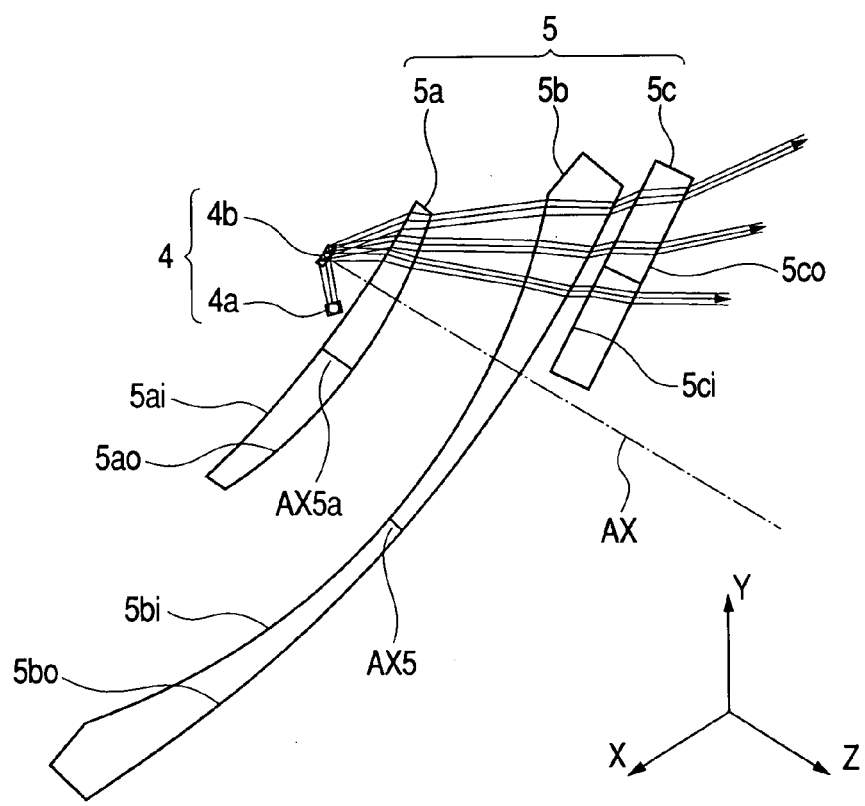
FIG. 5 is a vertical cross-sectional view of a two-dimensional scanning optical system in the first embodiment of the present invention.

FIG. 5 is a vertical cross-sectional view of the two-dimensional scanning optical system 5 of the two-dimensional scanning apparatus according to the present embodiment.

In the present embodiment, the two-dimensional scanning optical system 5 is constituted by the three scanning lenses 5a, 5b and 5c, and the first scanning lens 5a, the second scanning lens 5b and the third scanning lens 5c are arranged in order from the deflecting means 4 side. The optical axis AX of the two-dimensional scanning optical system 5 is defined as an axis passing through the center of the second deflector 4b and parallel to the optical axis AX5a of the first scanning lens 5a.

The three first, second and third scanning lenses 5a, 5b and 5c are disposed shifted or/and tilted in the vertical direction (Y-axis direction) with respect to the optical axis AX of the two-dimensional scanning optical system 5, and particularly the first scanning lens 5a and the second scanning lens 5b are shifted toward a side on which the beam does not pass with respect to the optical axis AX of the two-dimensional scanning optical system 5. Consequently, the first scanning lens 5a and the second scanning lens 5b use one side (the upper side as viewed in FIG. 5) alone with respect to the optical axes AX5a and AX5b of the respective scanning lenses 5a and 5b.

Figure 6:
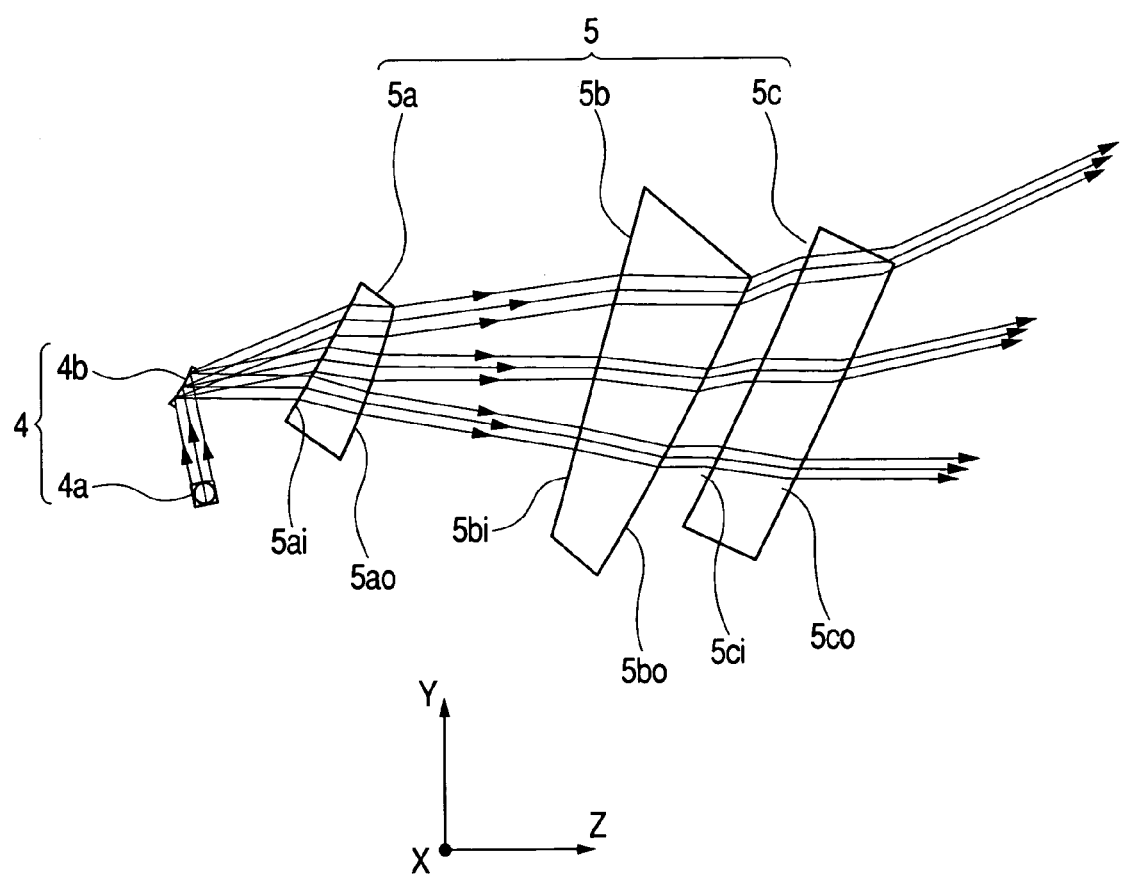
FIG. 6 is a vertical cross-sectional view of the two-dimensional scanning optical system in the first embodiment of the present invention.

FIG. 6 is a vertical cross-sectional view of the two-dimensional scanning optical system 5 of the two-dimensional scanning apparatus according to the present embodiment.

As shown in FIG. 6, those portions of the first, second and third scanning lenses 5a, 5b and 5c through which the ray of light does not pass are cut. The first and second scanning lenses 5a and 5b do not use the portions thereof underlying the optical axes AX5a and AX5b (not shown) of these lenses as viewed in FIG. 6 and therefore, these portions are cut.

Table 1 below shows the construction of the two-dimensional scanning apparatus according to the present embodiment.

Figure 7A:
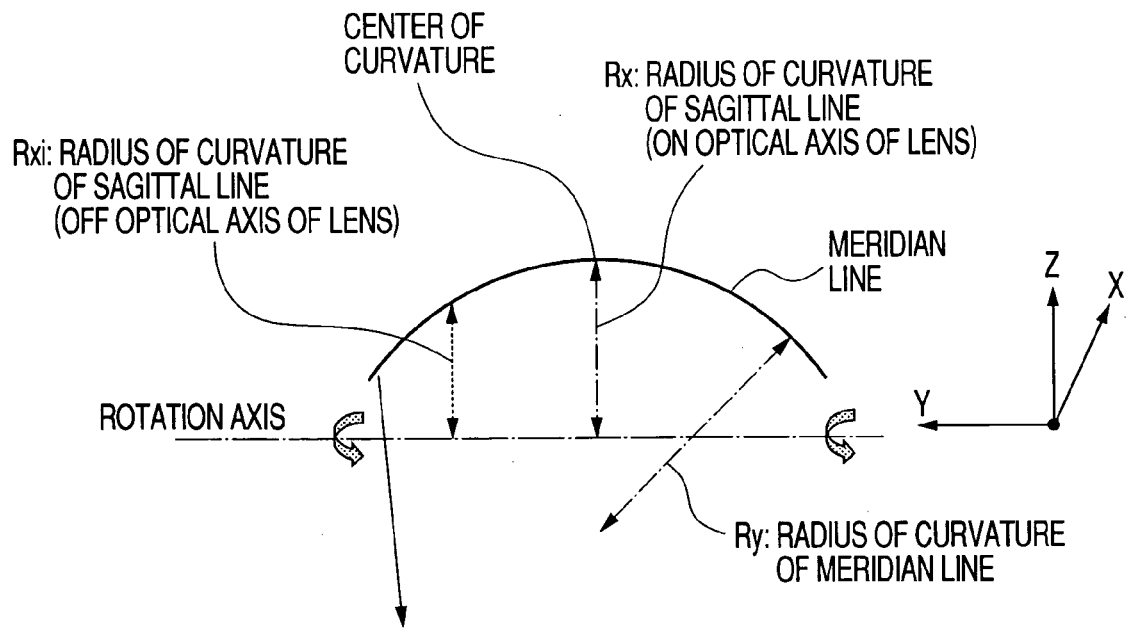
FIGS. 7A and 7B are illustrations of a Y toric surface.
Figure 7B:
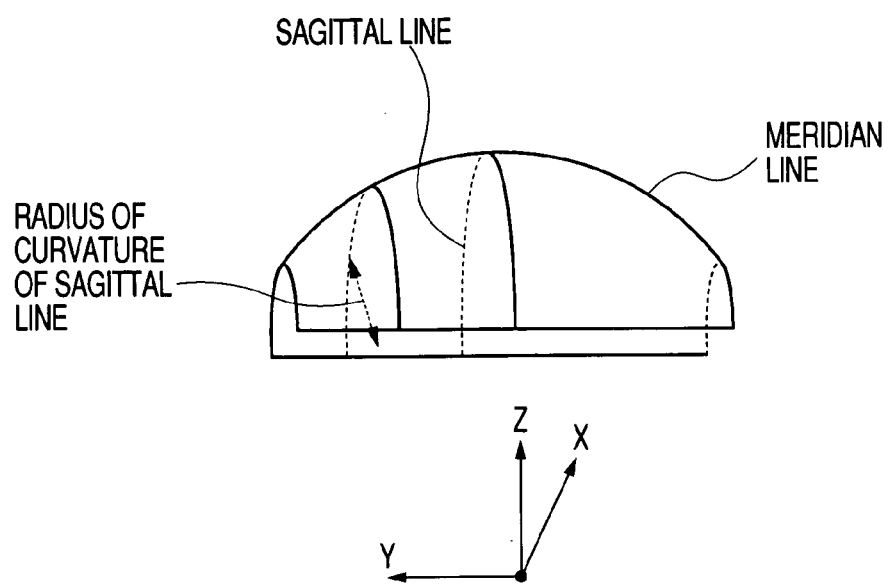

Here, the Y toric surface will be described with reference to FIGS. 7A and 7B. FIG. 7A shows the relation between the meridian line and sagittal line of the Y toric surface, and FIG. 7B is a schematic view of the essential portions of the Y toric surface formed by the meridian line shown in FIG. 7A being rotated.

As shown in FIG. 7A, the vertical direction (Y-axis direction) of the Y toric surface is the meridian line. A rotation axis is positioned in the same plane as this meridian line and separate by a distance Rx from the meridian line. As shown in FIG. 7B, the Y toric surface is a surface formed by the meridian line being rotated about this rotation axis. The Y toric surface is a surface of which the radius of curvature in the sagittal line direction (horizontal direction) (hereinafter referred to also as the "sagittal line radius of curvature") is determined by the distance between the meridian line and the rotation axis, and of which the sagittal line radius of curvature Rxi at a position along the meridian line direction (vertical direction) can be changed in conformity with the shape of the meridian line although the sagittal line radius of curvature at the center of the meridian line is Rx. Therefore, it is possible to relatively easily make a surface gradually changing in the radius of curvature, and it is also possible to polish and work a glass lens.

The incidence surface 5ai and emergence surface 5ao of the first scanning lens 5a and the incidence surface 5bi of the second scanning lens 5b are such that the meridian line of the Y toric surface is of an arcuate shape having a radius of curvature Ry. Also, the center of the curvature of the meridian line is on the deflecting means 4 side, and the

TABLE 1

Configuration of Scanning Optical System

| Lens | Surface | Surface shape | Ry | Rx | Thickness | Nd | vd | Coordinates x | Coordinates y | Coordinates z | Inclination A | Inclination b | Inclination c |
|---|---|---|---|---|---|---|---|---|---|---|---|---|---|
| Anamorphic incidence optical system 7 | Incidence surface | Flat surface | Flat | Flat | 3.40 | 1.51633 | 64.1 | | | | | | |
| | Emergence surface | Cylindrical surface | Flat | 77.85 | | | | | | | | | |
| 1st deflector 4a | Reflecting surface | Flat surface | Flat | Flat | | | | | | | | | |
| 2nd deflector 4b | Reflecting surface | Flat surface | Flat | Flat | | | | 0.00 | 0.00 | 0.00 | 17.87 | 0.00 | 0.00 |
| 1st scanning lens 5a | Incidence surface 5ai | Y toroidal surface | −131.553 | −25.253 | 5.00 | 1.83400 | 37.2 | 0.00 | −9.65 | 7.15 | 0.00 | 0.00 | 0.00 |
| | Emergence surface 5ao | Y toroidal surface | −57.776 | −17.139 | | | | 0.00 | −9.65 | 12.15 | 0.00 | 0.00 | 0.00 |
| 2nd scanning lens 5b | Incidence surface 5bi | Y toroidal surface | −90.209 | −26.860 | 2.00 | 1.83400 | 37.2 | 0.00 | −22.32 | 26.92 | −3.95 | 0.00 | 0.00 |
| | Emergence surface 5bo | Spherical surface | −182.723 | −182.723 | | | | 0.00 | −22.46 | 28.92 | −3.95 | 0.00 | 0.00 |
| 3rd scanning lens 5c | Incidence surface 5ci | Spherical surface | −202.969 | −202.969 | 5.00 | 1.48749 | 70.2 | 0.00 | 19.73 | 29.50 | 10.44 | 0.00 | 0.00 |
| | Emergence surface 5co | Cylindrical surface | Flat | −31.206 | | | | 0.00 | 20.64 | 34.42 | 10.44 | 0.00 | 0.00 |
| Surface to be scanned 6 | | Flat surface | Flat | Flat | | | | 0.00 | 275.83 | 386.68 | 35.74 | 0.00 | 0.00 |

As shown in Table 1, Y toric surfaces (Y toroidal surfaces) are adopted to the incidence surface 5ai and emergence surface 5ao of the first scanning lens 5a and the incidence surface 5bi of the second scanning lens 5b. The lens surfaces of the other scanning lenses are constituted by spherical surfaces or cylindrical surfaces.

rotation axis of the Y toric surface is also given to the deflecting means 4 side to thereby form a Y toric surface as a barrel-shaped toric surface. At this time, the sagittal line radius of curvature Rxi changes depending on the position of the meridian line, all of the above-mentioned three surfaces 5ai, 5ao and 5bi are of a shape in which the absolute value of the sagittal line radius of curvature gradually becomes smaller away from the center of the meridian line.

FIG. 8 shows the state of change in the absolute values of the sagittal line radii of curvature of the incidence surface 5ai and emergence surface 5ao of the first scanning lens 5a and the incidence surface 5bi of the second scanning lens 5b.

The incidence surface 5ai and emergence surface 5ao of the first scanning lens 5a and the incidence surface 5bi of the second scanning lens 5b adopt Y toric surfaces (Y toroidal surfaces) as described above. The Y toric surfaces are anamorphic surfaces monotonously changing in radius of curvature in which the absolute value of the sagittal line radius of curvature monotonously changes continuously from a great value to a small value along with this meridian line from one side toward the other side while the meridian line of the Y toric surfaces is an arc and has a constant radius of curvature. Thereby, in the present embodiment, image distortion (TV distortion or trapezoid distortion) occurring when the beam is two-dimensionally scanned by the deflecting means 4 can be corrected.

Figure 9:
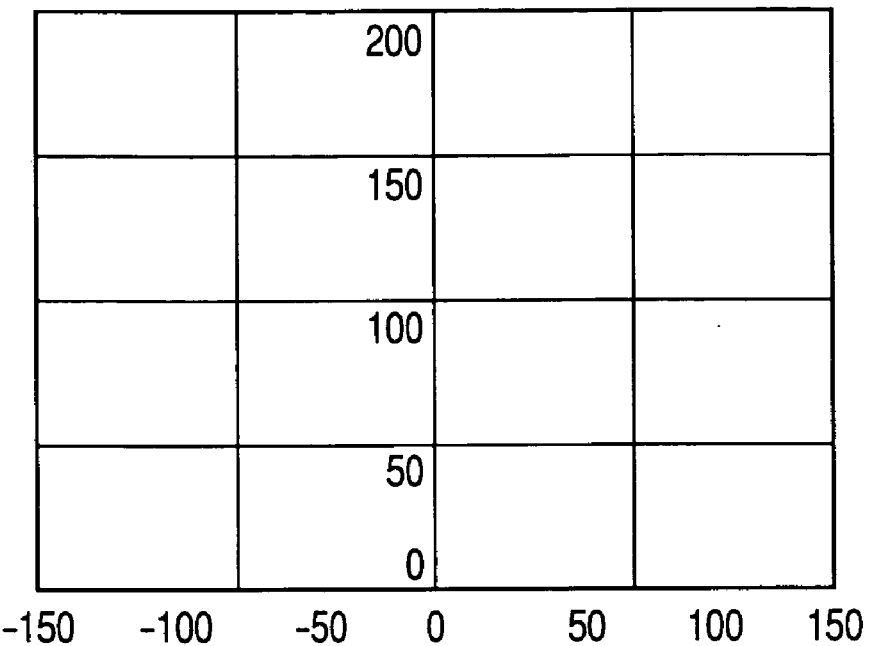
FIG. 9 shows a scanning image (grating) in the first embodiment of the present invention.
Figure 10:
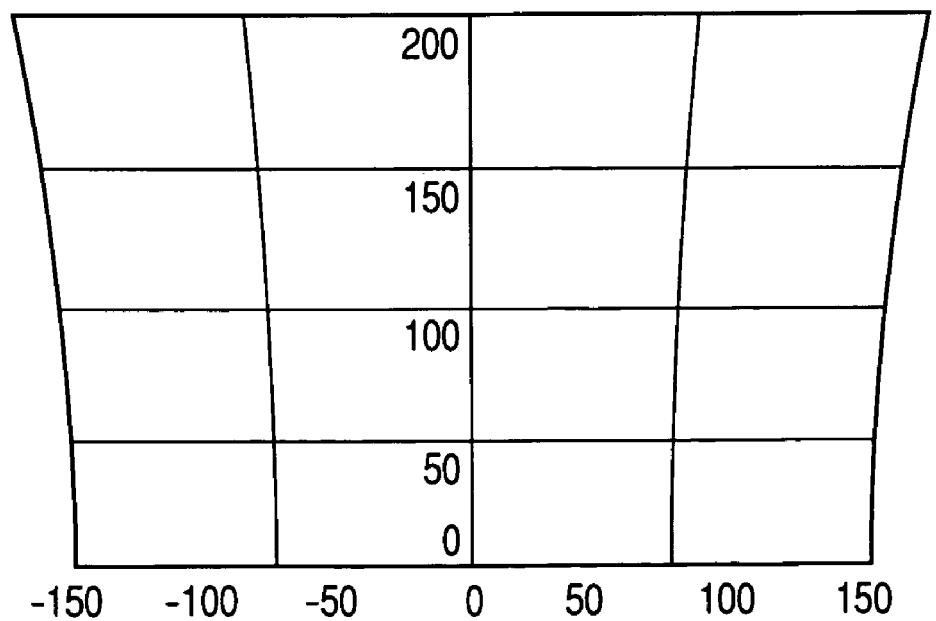
FIG. 10 shows a scanning image (grating) in a comparative example.

FIG. 9 shows the scanning image (grating) in the present embodiment. Table 2 below shows the values of the TV distortion and trapezoid distortion of the scanning image in the present embodiment. FIG. 10 shows a comparative example the scanning image (grating) when there is no correction of the image distortion by the two-dimensional scanning optical system. Table 3 below shows the values of the TV distortion and trapezoid distortion in the comparative example. The more approximate to 0 the values of the TV distortion and trapezoid distortion are, the better the performance is.

TABLE 2

|  | TV distortion | Trapezoid distortion |  |
|---|---|---|---|
| Upper side | 0.21 | 0.00 | (%) |
| Lower side | 0.20 | 0.00 | (%) |
| Left side | 0.14 | 0.20 | (%) |
| Right side | 0.14 | 0.20 | (%) |

TABLE 3

|  | TV distortion | Trapezoid distortion |  |
|---|---|---|---|
| Upper side | 0.00 | 0.00 | (%) |
| Lower side | 0.00 | 0.00 | (%) |
| Left side | 1.54 | 4.32 | (%) |
| Right side | 1.54 | 4.32 | (%) |

Methods of calculating the TV distortion and trapezoid distortion will now be described with reference to FIGS. 11A and 11B.

Figure 11A:
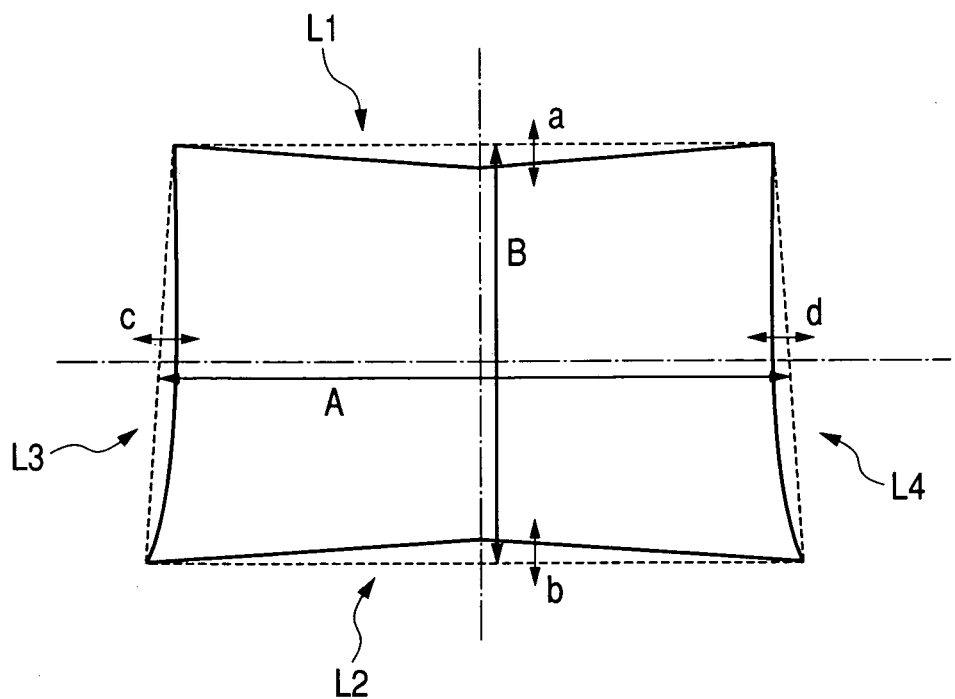
FIGS. 11A and 11B are illustrations of a method of calculating TV distortion and trapezoid distortion.

FIG. 11A illustrates the method of calculating the TV distortion. The TV distortion is an aberration amount indicative of an amount by which the frame of a displayed image is curved, and is obtained by dividing a displacement amount along an axis passing through the center of the image by the width of the image. Consequently, the TV distortion on each side of the frame of the picture is represented by the following expressions:

Upper side L1: a/B×100 (%)

Lower side L2: b/B×100 (%)

Left side L3: c/A×100 (%)

Right side L4: d/A×100 (%)

Figure 11B:
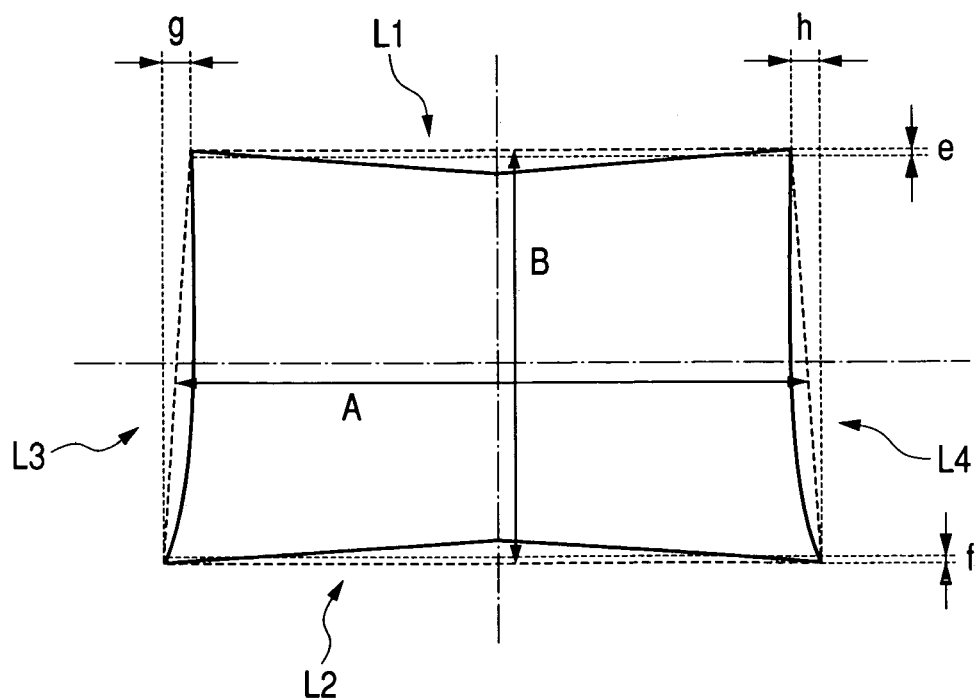

Also, FIG. 11B illustrates the method of calculating the trapezoid distortion. The trapezoid distortion is an aberration amount indicative of an amount by which the frame of the displayed image is inclined, and is a result obtained by the displacement amount of the angle of the image by the width of the image. Consequently, the trapezoid distortion on each side of the frame of the image is represented by the following expressions:

Upper side L1: e/2/B×100 (%)

Lower side L2: f/2/B×100 (%)

Left side L3: g/2/A×100 (%)

Right side L4: h/2/A×100 (%)

As shown in FIG. 10, in the case of the comparative example in which there is no correction of the image distortion by the two-dimensional scanning optical system, the trapezoid distortion by the oblique projecting method occurs, and is displayed as gradually widened in the horizontal direction from the lower portion to the upper portion of the scanned image. At the time, the amount of the trapezoid distortion is as great as 4.32% on the left side L3 and the right side L4.

Also, the TV distortion caused by the two-dimensionally optically scanning the screen surface 6 with the beam deflected by the deflecting means 4 occurs in the vertical direction. This is because the beam deflected in the horizontal direction by the first deflector 4a is incident on the second deflector 4b, which deflects the beam in the vertical direction, at various angles in a horizontal cross section, and when two one-dimensional deflectors are used, the curvature of the TV distortion occurs in the direction of a side for deflecting later. In the comparative example, the amount of the TV distortion is as great as 1.54% on the left side and the right side, and this poses a problem.

So, in the present embodiment, the TV distortion and trapezoid distortion are corrected well by the use of the two-dimensional scanning optical system 5 configured as described above. Particularly, by using the Y toric surface as the anamorphic surface monotonously changing in the radius of curvature, the correcting effect of the image distortion is improved.

Also, the correcting effect of the image distortion is markedly improved by providing the two-dimensional scanning optical system 5 with a plurality of anamorphic surfaces monotonously changing in the radius of curvature. At this time, it is preferable that at least one anamorphic surface monotonously changing in the radius of curvature be a surface having positive optical power, and in the X-axis direction, at least one anamorphic surface monotonously changing in the radius of curvature be a surface having negative optical power, and the sides on which the absolute values of the radii of curvature thereof become great or/and the sides on which the aforementioned absolute values become small be made coincident with each other and the radius of curvature of the sagittal line be bent. Thereby, the position of the principal plane can be changed without the total power in the horizontal direction (X-axis direction) being changed and therefore, the image distortion in the horizontal direction, i.e., the image distortion in which a vertical line is curved, can be corrected well.

Figure 12:
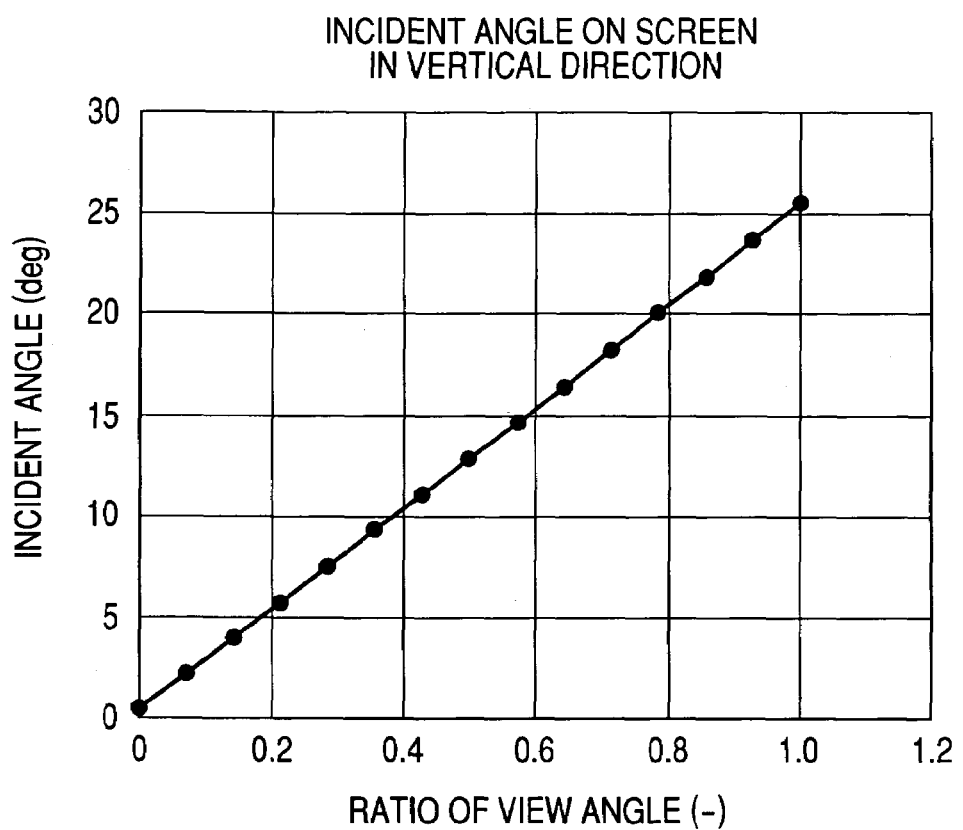
FIG. 12 is a graph showing the relation between the position of a screen and the incident angle.

FIG. 12 shows the relation between the position of the screen surface and the incident angle of the beam incident on the screen surface, in the vertical direction (Y-axis direction) in the present embodiment.

In the present embodiment, in the vertical direction of the screen surface 6, the screen surface 6 is optically scanned by the oblique projecting method of projecting an image onto an upper side with respect to the positions of the deflecting means 4 and the two-dimensional scanning optical system 5. At this time, of the beams deflected by the deflecting means 4 and having reached the screen surface 6 through the two-dimensional scanning optical system 5, the beam having reached the lower portion of the screen surface 6 is incident on the screen surface 6 at a small angle.

On the other hand, the beam reaching the upper portion of the screen surface 6 is incident on the screen surface 6 at a great angle. Depending on the position at which the beam reaches screen surface 6, the incident angle of the beam on the screen surface 6 gradually changes.

The respective Y toric surfaces 5ai, 5ao and 5bi in the present embodiment are all barrel-shaped toric surfaces, and the center of the meridian line thereof is on the lower side in the vertical direction (Y-axis direction) of the screen surface 6 and therefore, the beams passed through the portions of the respective Y toric surfaces 5ai, 5ao and 5bi, where the radius of curvature of the sagittal line are great, reach the lower portion of the screen, and the beams passed through the portions of the respective Y toric surfaces 5ai, 5ao and 5bi, where the radius of curvature of the sagittal line are small, reach the upper portion of the screen.

That is, design is made such that in the vertical direction, the angle θvh, at which the beam; passed through the portions of the scanning lenses 5a and 5b having the anamorphic surfaces monotonously changing in the radius of curvature which are small in the absolute value of the radius of curvature in the sagittal line direction (horizontal direction); is incident on the screen surface 6, is greater than the angle θvl, at which the beam passed through the portions of the scanning lenses 5a and 5b which are great in the absolute value of the radius of curvature in the sagittal line direction. Thereby, in the present embodiment, the image distortion is corrected well.

As described above, in the present embodiment, in the two-dimensional scanning apparatus wherein the screen surface 6 is two-dimensionally optically scanned to thereby display an image, the image distortion such as the TV distortion occurring when the beam is two-dimensionally deflected by the deflecting means 4 and the trapezoid distortion caused by the oblique projecting method is corrected well. Particularly at least one surface of the three first, second and third scanning lenses constituting the two-dimensional scanning optical system 5 is made into an anamorphic surface monotonously changing in the radius of curvature of which the absolute value of the radius of curvature in the sagittal line direction (horizontal direction) at a position along with the meridian line direction (vertical direction), whereby the image distortion can be corrected well. Thereby, there can be provided a two-dimensional scanning apparatus which can display a scanning image of high quality having had its distortion corrected on the screen surface 6.

While in the present embodiment, description has been made of an example using the anamorphic surface monotonously changing in the radius of curvature as the lens surface of the scanning lens, this is not restrictive, however the present invention can obtain an effect equal to that of the aforedescribed embodiment even if, for example, a reflecting mirror is provided between the deflecting means and the screen surface, and an anamorphic surface monotonously changing in the radius of curvature is formed on the reflecting surface of the reflecting mirror.

Also, in the present embodiment, as described above, the anamorphic incidence optical system 7 is disposed between the light source means 1 and the first deflector 4a. In this anamorphic incidence optical system 7, is weaker in the optical power in the horizontal direction (X-axis direction) is weaker than that in the vertical direction (Y-axis direction), and can convert the beam emitted from the light source means 1 into a beam having the degree of convergence in the horizontal direction weaker than that in the vertical direction, or a beam having the degree of divergence in the horizontal direction stronger than that in the vertical direction.

The anamorphic incidence optical system 7 in the present embodiment is constituted by a cylindrical lens of which the incidence surface is a flat surface and the emergence surface is a cylindrical surface having a concave surface in the horizontal direction.

In the present embodiment, the beam emitted from the light source means 1 is converted into a parallel beam by the collimator lens 2, and thereafter is converted into a divergent beam only in the horizontal direction by the anamorphic incidence optical system 7, and is caused to enter the first deflector 4a as the parallel beam in the vertical direction.

To well correct the image distortion such as the TV distortion and the trapezoid distortion caused by the oblique projecting method as in the present embodiment, it is effective to give anamorphic power to the two-dimensional scanning optical system 5, however on the other hand, astigmatism becomes liable to occur in both the horizontal and the vertical directions, thus resulting in the deterioration of resolution.

So, in the present embodiment, the anamorphic incidence optical system 7 is disposed between the light source means 1 to the deflecting means 4, to thereby correct the astigmatism occurring in the two-dimensional scanning optical system 5.

In the present embodiment, the beam emitted from the light source means 1 is first deflected in the horizontal direction by the first deflector 4a, and then is deflected in the vertical direction by the second deflector 4b, and is two-dimensionally scanned the screen. At this time, the anamorphic incidence optical system 7 disposed between the light source means 1 and the first deflector 4a has its optical power (condensing power) in the horizontal direction made weaker than its optical power in the vertical direction, as previously described. Specifically, a cylindrical lens 7 constituting the anamorphic incidence optical system 7 is made to have negative optical power in the horizontal direction and have no optical power in the vertical direction. Thereby, astigmatism caused on the screen surface 6 by the two-dimensional scanning optical system 5 is corrected well. Further, the effect of correcting the image distortion of the two-dimensional scanning optical system 5 is improved.

In the present embodiment, a cylindrical lens is used as the anamorphic incidence optical system 7, thereby facilitating the manufacture thereof and achieving a reduction in cost.

As described above, in the present embodiment, the TV distortion caused by the two-dimensional deflection of the beam by the deflecting means and the trapezoid distortion caused by the oblique projection of the image onto the screen surface are corrected well by the use of the two-dimensional scanning optical system constructed as described above.

While in the present embodiment, anamorphic surfaces monotonously changing in the radius of curvature are formed on three surfaces, i.e., the incidence surface and emergence surface of the first scanning lens 5a, and the incidence surface of the second scanning lens 5b, this is not restrictive, however the anamorphic surfaces can be formed on one or more surfaces.

Second Embodiment

Figure 13:
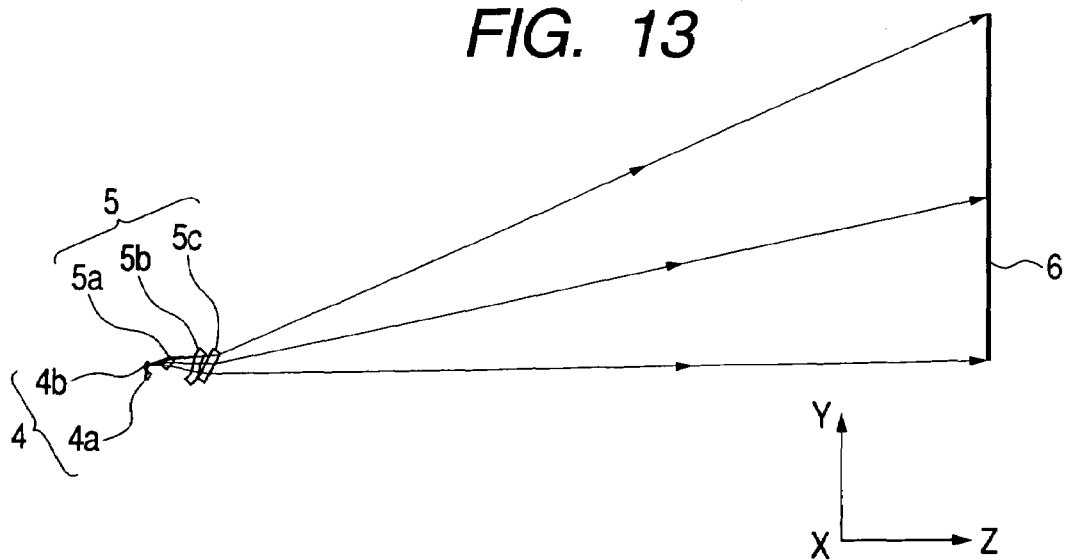
FIG. 13 is a vertical cross-sectional view of a two-dimensional scanning apparatus according to a second embodiment of the present invention.

FIG. 13 is a cross-sectional view (vertical cross-sectional view) of the essential portions of a two-dimensional scanning apparatus according to a second embodiment of the present invention in a vertical direction. In FIG. 13, the same elements as the elements shown in FIG. 1 are given the same reference characters.

The difference of this embodiment from the aforedescribed first embodiment is that the lens shapes of the scanning lenses 5a, 5b and 5c constituting the two-dimensional scanning optical system 5 are changed. In the other points, the configuration and optical action of the present embodiment are substantially similar to those of the first embodiment, whereby a similar effect can be obtained.

That is, in FIG. 13, the reference numeral 5 designates the two-dimensional scanning optical system (scanning optical means) having three first, second and third scanning lenses 5a, 5b and 5c having lens shapes different from those in the first embodiment, and it causes a beam two-dimensionally deflected by the deflecting means 4 to be imaged as a spot on the screen surface 6.

Tables 4A and 4B below show the configuration of the two-dimensional scanning apparatus according to the present embodiment.

TABLE 4A

Configuration of Scanning Optical System

| Lens | Surface | Surface shape | Ry | Rx | Thickness | Nd | vd | Coordinates x | Coordinates y | Coordinates z | Inclination A | Inclination b | Inclination c |
|---|---|---|---|---|---|---|---|---|---|---|---|---|---|
| Anamorphic incidence optical system 7 | Incidence surface | Flat surface | Flat | Flat | 3.40 | 1.51633 | 64.1 | | | | | | |
| | Emergence surface | Cylindrical surface | Flat | 77.85 | | | | | | | | | |
| 1st deflector 4a | Reflecting surface | Flat surface | Flat | Flat | | | | | | | | | |
| 2nd deflector 4b | Reflecting surface | Flat surface | Flat | Flat | | | | 0.00 | 0.00 | 0.00 | 18.24 | 0.00 | 0.00 |
| 1st scanning lens 5a | Incidence surface 5ai | Aspherical Y toroidal surface | −137.243* | −31.085 | 5.00 | 1.83400 | 37.2 | 0.00 | −18.29 | 9.78 | 0.00 | 0.00 | 0.00 |
| | Emergence surface 5ao | Aspherical Y toroidal surface | −98.056* | −20.699 | | | | 0.00 | −18.29 | 14.78 | 0.00 | 0.00 | 0.00 |
| 2nd scanning lens 5b | Incidence surface 5bi | Aspherical Y toroidal surface | −288.012* | −34.998 | 2.00 | 1.83400 | 37.2 | 0.00 | −52.73 | 27.50 | −7.46 | 0.00 | 0.00 |
| | Emergence surface 5bo | Spherical surface | −223.611 | −223.611 | | | | 0.00 | −52.99 | 29.48 | −7.46 | 0.00 | 0.00 |
| 3rd scanning lens 5c | Incidence surface 5ci | Spherical surface | −189.974 | −189.974 | 5.00 | 1.48749 | 70.2 | 0.00 | 21.17 | 29.50 | 10.97 | 0.00 | 0.00 |
| | Emergence surface 5co | Cylindrical surface | Flat | −31.847 | | | | 0.00 | 22.12 | 34.41 | 10.97 | 0.00 | 0.00 |
| Surface to be scanned 6 | | Flat surface | Flat | Flat | | | | 0.00 | 291.87 | 394.66 | 36.47 | 0.00 | 0.00 |

The mark * indicates an aspherical surface shape, and the radius of the base curved surface.

TABLE 4B

Aspherical Surface Coefficient

| Lens | Surface | Surface shape | K | A | B | C | D |
|---|---|---|---|---|---|---|---|
| 1st scanning lens 5a | Incidence surface 5ai | Aspherical Y toroidal surface | 8.46135E+00 | −3.47858E−07 | 8.20614E−10 | 0.00000E+00 | 0.00000E+00 |
| | Emergence surface 5ao | Aspherical Y toroidal surface | −2.53456E−01 | −3.43987E−06 | 1.42176E−09 | 0.00000E+00 | 0.00000E+00 |
| 2nd scanning lens 5b | Incidence surface 5bi | Aspherical Y toroidal surface | 7.35053E+00 | −4.60464E−07 | 3.04109E−11 | 0.00000E+00 | 0.00000E+00 |

In the present embodiment, the incidence surface 5ai and emergence surface 5ao of the first scanning lens 5a and the incidence surface 5bi of the second scanning lens 5b are made into Y toric surfaces, and the lens surfaces of the other scanning lenses are constituted by spherical surfaces or cylindrical surfaces.

The Y toric surface in the present embodiment is a surface formed by a meridian line shape which is a shape in the vertical direction (Y-axis direction) being made into an aspherical surface shape expressed by the following expression (1), and the Y toric surface can be obtained by rotating the meridian line about an axis in a same plane where the meridian line exists at a position separate by a distance X from the meridian line (hereinafter referred to as the "aspherical Y toric surface" (or also as the aspherical Y toroidal surface)). The lens having the aspherical Y toric surface will hereinafter be referred to also as the "aspherical Y toric lens".

$$Z = \frac{\frac{Y^2}{Ry}}{1 + \sqrt{1 - (1+k) \times \left[\frac{Y}{Ry}\right]^2}} + AY^4 + BY^6 + CY^8 + DY^{10}, \quad (1)$$

where
Ry: radius of curvature in Y direction
k: conic constant
A, B, C, D: aspherical surface coefficients In the Y toric surface, the distance from the meridian line to the rotation axis is the radius of curvature of the sagittal line and therefore, the change in the radius of curvature of the sagittal line along the meridian line is determined by the shape of the meridian line. When as in the present embodiment, the meridian line is constituted by an aspherical shape, the shape of the sagittal line remains arcuate, however there is an advantage that the radius of curvature of the arcuate shape of the sagittal line can be determined relatively freely.

Figure 14:
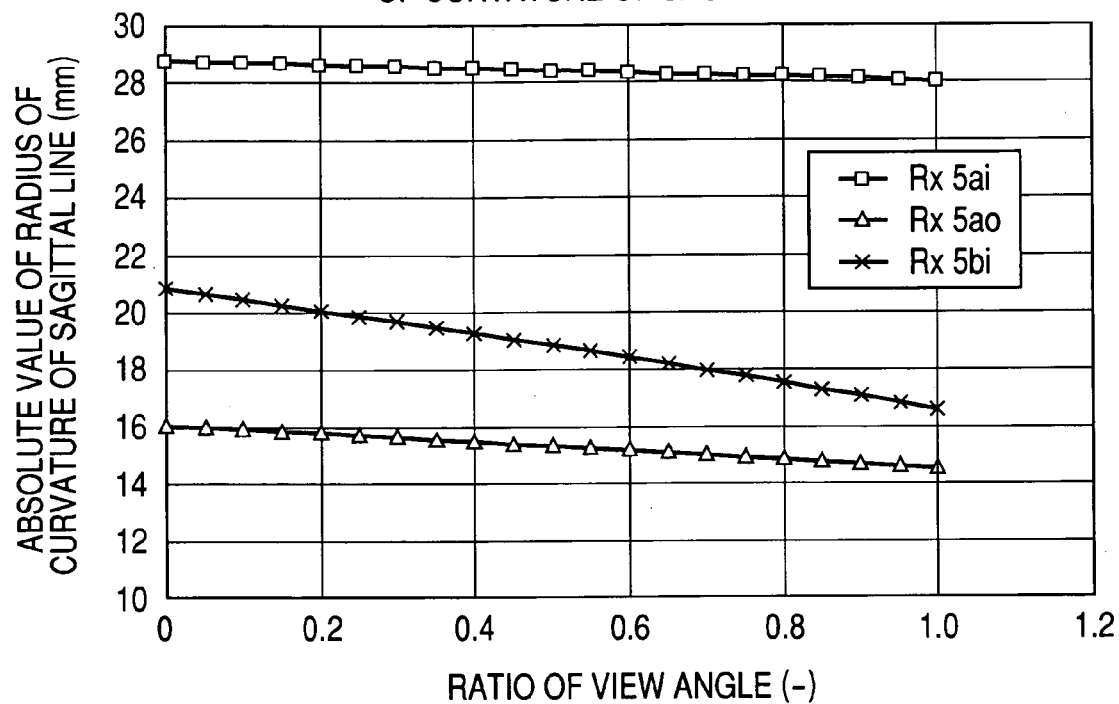
FIG. 14 shows the state of change in the radius of curvature of the sagittal line of a scanning lens in the second embodiment of the present invention.

FIG. 14 is a graph showing the state of change in the absolute value of the radius of curvature of the sagittal line on the incidence surface 5ai and emergence surface 5ao of the first scanning lens 5a and the incidence surface 5bi of the second scanning lens 5b in the present embodiment.

In the present embodiment, as in the aforedescribed first embodiment, the incidence surface 5ai and emergence surface 5ao of the first scanning lens 5a and the incidence surface 5bi of the second scanning lens 5b are barrel-shaped toric surfaces of which the meridian line (vertical direction) and the sagittal line (horizontal direction) have the center of curvature on the deflecting means 4 side, and are anamorphic surfaces monotonously changing in the radius of curvature of which the absolute value of the radius of curvature of the sagittal line continuously monotonously decreases from a great value to a small value along with the meridian line from one side toward the other side. Thereby, in the present embodiment, the image distortion (TV distortion and trapezoid distortion) occurring when the beam is two-dimensionally optically scanned by the deflecting means is corrected well.

Also, of the incidence surface 5ai and emergence surface 5ao of the first scanning lens 5a and the incidence surface 5bi of the second scanning lens 5b, the sides on which the absolute value of the radius of curvature of the sagittal line is great are same side, and so as to bend the radius of curvature of the sagittal line by the surface having negative optical power and the surface having positive optical power. Further, in the present embodiment, by making the shape of the meridian line into an aspherical shape, not only the correction of aberrations in the vertical direction is effected, but also a degree of freedom is given to the change in the radius of curvature of the sagittal line to thereby make the correcting effect of the TV distortion and trapezoid distortion great.

Figure 15:
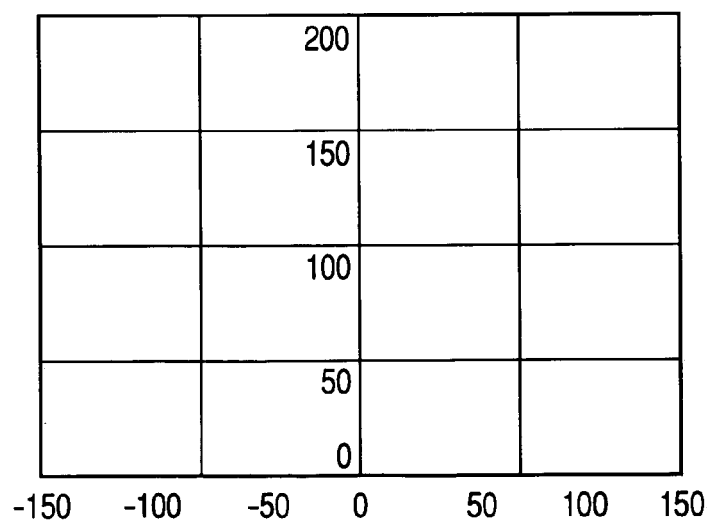
FIG. 15 shows a scanning image (grating) in the second embodiment of the present invention.

FIG. 15 shows the scanning image (grating) in the present embodiment. Table 5 below shows the amounts of the TV distortion and trapezoid distortion.

TABLE 5

|  | TV distortion | Trapezoid distortion |  |
|---|---|---|---|
| Upper side | 0.18 | 0.00 | (%) |
| Lower side | 0.08 | 0.00 | (%) |
| Left side | 0.09 | 0.12 | (%) |
| Right side | 0.09 | 0.12 | (%) |

In the two-dimensional scanning apparatus according to the present embodiment, the amount of the TV distortion is 0.18% on the upper side L1, 0.08% on the lower side L2, 0.09% on the left side L3, and 0.09% on the right side L4, and the TV distortion is corrected well. The amount of the trapezoid distortion is 0.12% on the left side L3, and 0.12% on the right side L4, and the trapezoid distortion is corrected considerably well.

If as in the present embodiment, use is made of an aspherical Y toric lens of which the meridian line is of an aspherical shape, the radius of curvature of the sagittal line can be selected relatively freely and therefore, a change in the radius of curvature of the sagittal line can be set which can well correct the TV distortion or/and the trapezoid distortion. Thereby, the TV distortion and the trapezoid distortion can be corrected better than by the configuration of the aforedescribed first embodiment.

While in the present embodiment, the aspherical Y toric lens has been mentioned as an example, this is not restrictive, but even if the radius of curvature of the sagittal line is changed, for example, irrespective of the shape of the meridian line, the effect of the present invention can be sufficiently obtained.

Also, by adopting this two-dimensional scanning apparatus to a scanning type image displaying apparatus, there can be provided an image forming apparatus which can always display an image of high quality.

Third Embodiment

Figure 16:
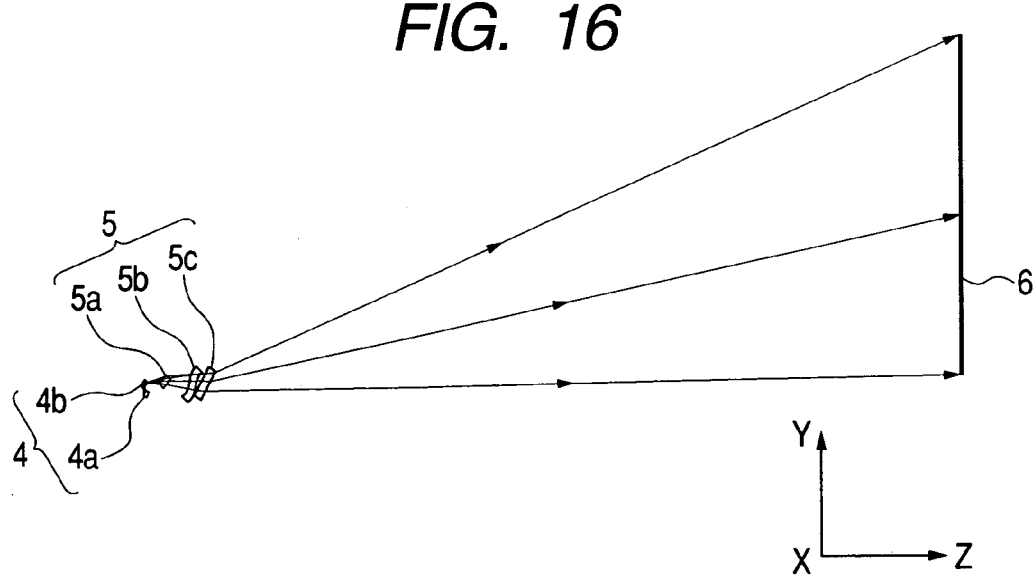
FIG. 16 is a vertical cross-sectional view of a two-dimensional scanning apparatus according to a third embodiment of the present invention.

FIG. 16 is a cross-sectional view (vertical cross-sectional view) of the essential portions of a two-dimensional scanning apparatus according to a third embodiment of the present invention in a vertical direction. In FIG. 16, the same elements as the elements shown in FIG. 1 are given the same reference characters.

The difference of this embodiment from the aforedescribed second embodiment is that besides the aspherical Y toric surfaces, configuring a two-dimensional scanning optical system 5 having a free curved surface having no correlation between the radii of curvature in the meridian line direction and the sagittal line direction. In the other points, the construction and optical action of the present embodiment are substantially same as those of the first embodiment, whereby a similar effect can be obtained.

That is, in FIG. 16, the reference numeral 5 designates a two-dimensional scanning optical system (scanning optical means) having three first, second and third scanning lenses 5a, 5b and 5c having lens shapes different from those in the second embodiment, and it causes a beam two-dimensionally deflected by deflecting means 4 to be imaged as a spot on a screen surface 6. The two-dimensional scanning optical system 5 in the present embodiment is configured by providing a free curved surface having no correlation between the radii of curvature in the meridian line direction and the sagittal line direction, besides the aspherical Y toric surfaces.

Tables 6A and 6B below show the configuration of the two-dimensional scanning optical apparatus according to the present embodiment.

TABLE 6A

Configuration of Scanning Optical System

| Lens | Surface | Surface shape | Ry | Rx | Thickness | Nd | vd | Coordinates of surface vertex | | | | | |
|---|---|---|---|---|---|---|---|---|---|---|---|---|---|
| | | | | | | | | Coordinates | | | Inclination | | |
| | | | | | | | | x | y | z | a | b | c |
| Anamorphic incidence optical system 7 | Incidence surface | Flat surface | Flat | Flat | 3.40 | 1.51633 | 64.1 | | | | | | |
| | Emergence surface | Cylindrical surface | Flat | 55.22 | | | | | | | | | |
| 1st deflector 4a | Reflecting surface | Flat surface | Flat | Flat | | | | | | | | | |
| 2nd deflector 4b | Reflecting surface | Flat surface | Flat | Flat | | | | 0.00 | 0.00 | 0.00 | 18.67 | 0.00 | 0.00 |
| 1st scanning lens 5a | Incidence surface 5ai | Aspherical Y toroidal surface | −147.124* | −35.309 | 5.00 | 1.83400 | 37.2 | 0.00 | −27.53 | 12.81 | 0.00 | 0.00 | 0.00 |
| | Emergence surface 5ao | Aspherical Y toroidal surface | −105.886* | −24.450 | | | | 0.00 | −27.53 | 17.81 | 0.00 | 0.00 | 0.00 |
| 2nd scanning lens 5b | Incidence surface 5bi | Aspherical Y toroidal surface | −391.613* | −47.118 | 2.00 | 1.83400 | 37.2 | 0.00 | −70.37 | 27.50 | −14.02 | 0.00 | 0.00 |
| | Emergence surface 5bo | XY polynomial surface | −314.712* | −314.712* | | | | 0.00 | −70.86 | 29.44 | −14.02 | 0.00 | 0.00 |
| 3rd scanning lens 5c | Incidence surface 5ci | XY polynomial surface | −255.194* | −255.194* | 5.00 | 1.48749 | 70.2 | 0.00 | 17.22 | 29.50 | 9.95 | 0.00 | 0.00 |
| | Emergence surface 5co | Y toroidal surface | −987.450 | −34.003 | | | | 0.00 | 18.08 | 34.42 | 9.95 | 0.00 | 0.00 |
| Surface to be scanned 6 | | Flat surface | Flat | Flat | | | | 0.00 | 319.51 | 409.24 | 37.34 | 0.00 | 0.00 |

The mark * indicates an aspherical surface shape, and the radius of the base curved surface.

TABLE 6B

Aspherical Surface Coefficients

| Lens | Surface | Surface shape | K | A | B | C | D |
|---|---|---|---|---|---|---|---|
| 1st scanning lens 5a | Incidence surface 5ai | Aspherical Y toroidal surface | 2.44768E+00 | 1.16207E−07 | 1.90241E−10 | 0.00000E+00 | 0.00000E+00 |
| | Emergence surface 5ao | Aspherical Y toroidal surface | −4.16800E+01 | −2.72736E−06 | 6.63899E−10 | 0.00000E+00 | 0.00000E+00 |
| 2nd scanning lens 5b | Incidence surface 5bi | Aspherical Y toroidal surface | 1.43259E+01 | −4.79481E−07 | 2.80767E−11 | 0.00000E+00 | 0.00000E+00 |

| Lens | Surface | Surface shape | | | | | | |
|---|---|---|---|---|---|---|---|---|
| | | | K | $C_{20}$ | $C_{02}$ | $C_{21}$ | $C_{03}$ | $C_{40}$ |
| 2nd scanning lens 5b | Emergence surface 5bo | XY polynomial surface | −1.16960E+01 | −8.75960E−04 | −2.10320E−03 | 1.30340E−05 | 2.07420E−06 | −1.97510E−06 |
| | | | $C_{22}$ | $C_{04}$ | $C_{60}$ | $C_{42}$ | $C_{24}$ | $C_{06}$ |
| | | | 1.90140E−07 | 5.15450E−09 | −3.88790E−09 | 2.58840E−10 | −2.49990E−11 | 9.47240E−13 |

| Lens | Surface | Surface shape | K | $C_{20}$ | $C_{02}$ | $C_{40}$ | $C_{22}$ | $C_{04}$ |
|---|---|---|---|---|---|---|---|---|
| 2nd scanning lens 5b | Emergence surface 5bo | XY polynomial surface | 5.08160E+01 | 2.43690E−03 | −7.65780E−04 | −1.81650E−06 | 1.19040E−06 | 9.40240E−07 |

The two-dimensional scanning optical system 5 in the present embodiment, like that in the aforedescribed second embodiment, is constituted by three first, second and third scanning lenses 5a, 5b and 5c. The incidence surface 5ai and emergence surface 5ao of the first scanning lens 5a, and the incidence surface 5bi of the second scanning lens 5b are aspherical Y toric surfaces (aspherical Y toroidal surfaces), and free curved surfaces satisfying the XY polynomial expression shown in the following expression (2) are used as the emergence surface 5bo of the second scanning lens 5b and the incidence surface 5ci of the third scanning lens 5c.

$$Z = \frac{\frac{Y^2}{R}}{1 + \sqrt{1 - (1+k) \times \left[\frac{Y}{R}\right]^2}} + \sum C_{mn} X^m Y^n , \quad (2)$$

where
R: radius of curvature (R=Ry=Rx)
k: conic constant
$C_{mn}$: coefficient of $X^m Y^n$
m, n: integers (m+n≦6)

Figure 17:
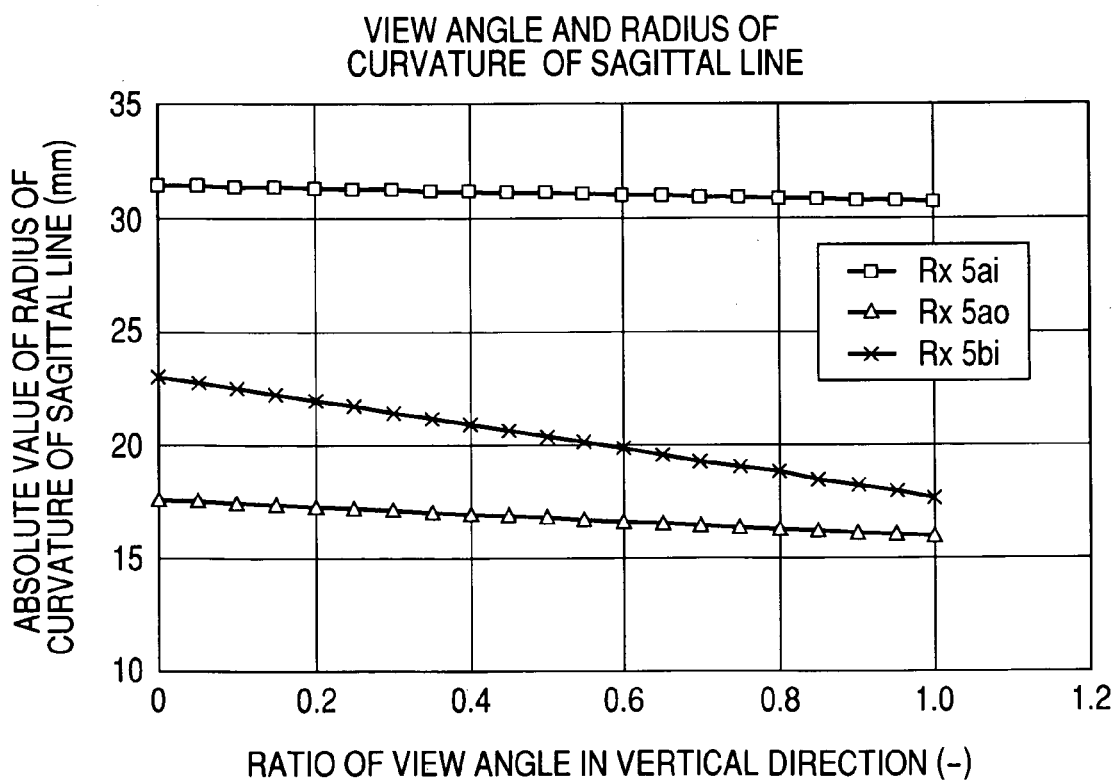
FIG. 17 is a graph showing the state of change in the radius of curvature of the sagittal line of a scanning lens in the third embodiment of the present invention.

FIG. 17 is a graph showing the state of change in the absolute values of the radii of curvature of the sagittal line on the incidence surface 5ai and emergence surface 5ao of the first scanning lens 5a and the incidence surface 5bi of the second scanning lens 5b in the present embodiment.

In the present embodiment, as in the aforedescribed second embodiment, the aspherical Y toric surfaces, which are the incidence surface 5ai and emergence surface 5ao of the first scanning lens 5a and the incidence surface 5bi of the second scanning lens 5b, are made into anamorphic surfaces monotonously changing in the radius of curvature of which the radius of curvature of the sagittal line changes along with the meridian line direction (vertical direction) and the radius of curvature of the sagittal line monotonously increases from one side toward the other side of the meridian line direction. Thereby, in the present embodiment, the image distortion (TV distortion and trapezoid distortion) caused by the two-dimensionally optically scanning with the beam by the deflecting means 4 is corrected well.

Figure 18:
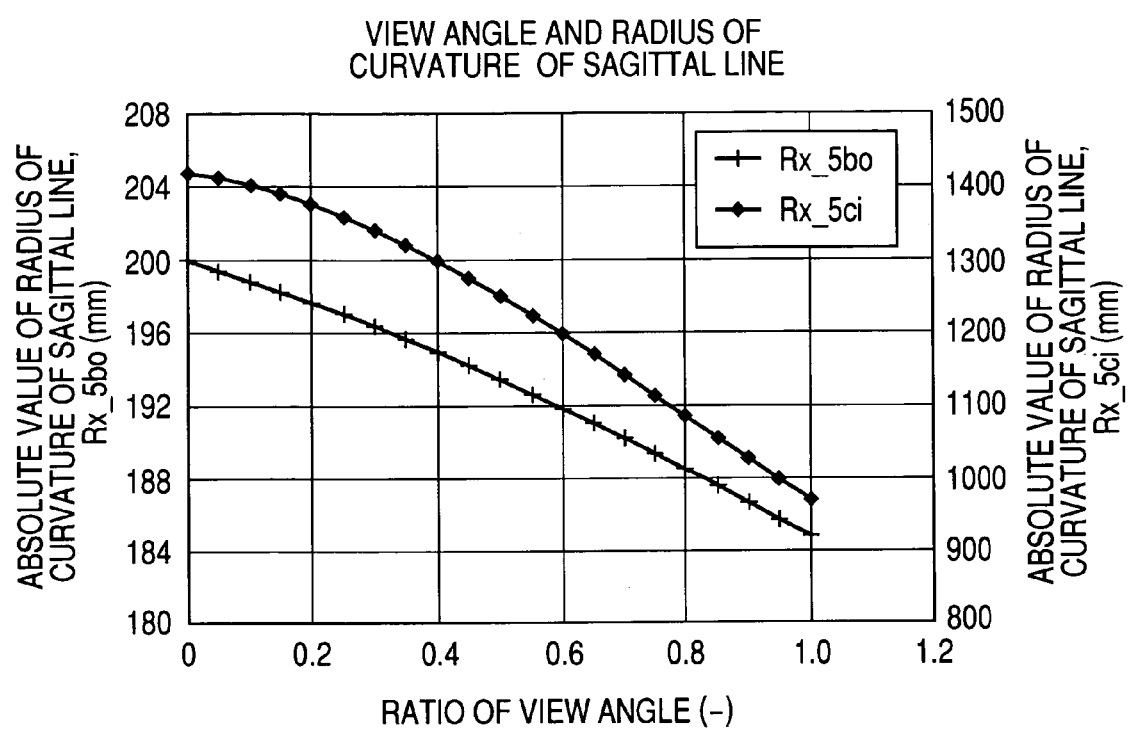
FIG. 18 is a graph showing the states of change in the radius of curvature of the sagittal lines in the emergence surface of a second scanning lens and the incidence surface of a third scanning lens in the third embodiment of the present invention.

FIG. 18 is a graph showing changes in the absolute values of the radii of curvature of the sagittal lines on the emergence surface 5bo of the second scanning lens 5b and the incidence surface 5ci of the third scanning lens 5c in the present embodiment. In FIG. 18, the abscissas indicates the view angle in the vertical direction, and the vertical axis indicates the absolute value of the radius of curvature of a local position of the sagittal line (local radius of curvature) at a position where the beam passes each lens surface when the view angle in the horizontal direction is maximum and the view angle in the vertical direction is of each value.

The emergence surface 5bo of the second scanning lens 5b and the incidence surface 5ci of the third scanning lens 5c in the present embodiment are free curved surfaces expressed by the XY polynomial expression, and the shape of the sagittal lines thereof is formed by an aspherical shape and therefore, they are surfaces of which the local radius of curvature of the sagittal line changes depending on the position of the lens surface in the horizontal direction (X-axis direction). Also, in the horizontal direction, the surface is made into a bilaterally symmetrical shape with respect to the optical axis of the lens and has only even-order aspherical surface coefficients and is bilaterally symmetrically used, while in the vertical direction (Y-axis direction), the surface is made into an asymmetrical shape having odd-order aspherical surface coefficients, and is asymmetrically used with respect also to the optical axis of the lens.

The characteristic of this surface is effectively used to monotonously change the local radius of curvature in the vertical direction on the peripheral portion of an image in which image distortion such as the TV distortion and trapezoid distortion is liable to occur, whereby the image distortion can be corrected well.

In the comparative example of the present invention, the TV distortion and trapezoid distortion occur on the lines (the left side L3 and the right side L4) in the vertical direction (Y-axis direction). So, in the present embodiment, the emergence surface 5bo of the second scanning lens 5b and the incidence surface 5ci of the third scanning lens 5c are made into surfaces monotonously changing in the curvature of the sagittal line (anamorphic surfaces monotonously changing in the local radius of curvature) of which the radius of curvature in the horizontal direction (local radius of curvature) gradually becomes greater from one side toward the other side along the vertical direction on the peripheral portion (view angle 1.0) in the horizontal direction, whereby the image distortion (TV distortion and trapezoid distortion) caused by the two-dimensionally optically scanning with the beam by the deflecting means 4 is corrected well.

Figure 19:
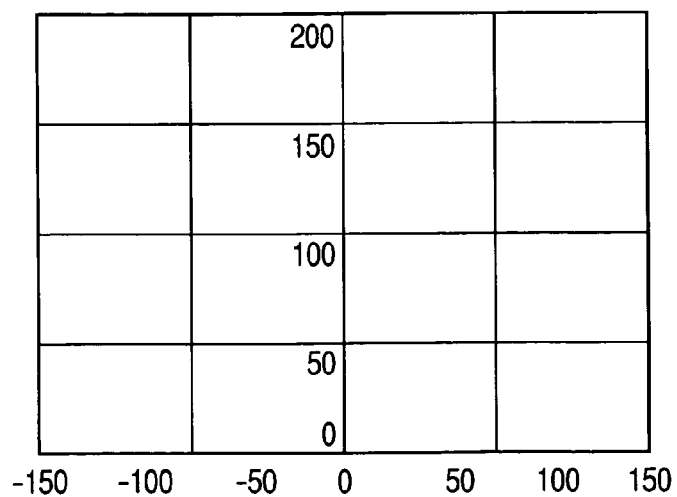
FIG. 19 shows a scanning image (grating) in the third embodiment of the present invention.

FIG. 19 shows the scanning image (grating) in the two-dimensional scanning apparatus according to the present embodiment. Table 7 below shows the amounts of the TV distortion and the trapezoid distortion.

TABLE 7

|  | TV distortion | Trapezoid distortion |  |
| --- | --- | --- | --- |
| Upper side | 0.02 | 0.00 | (%) |
| Lower side | 0.06 | 0.00 | (%) |
| Left side | 0.01 | 0.00 | (%) |
| Right side | 0.01 | 0.00 | (%) |

In the two-dimensional scanning apparatus according to the present embodiment, the TV distortion is 0.02% on the upper side L1, 0.06% on the lower side L2, 0.01% on the left side L3, and 0.01% on the right side L4, and the TV distortion is corrected substantially completely. Also, the trapezoid distortion is 0.00% on all of the upper side L1, the lower side L2, the left side L3 and the right side L4, and the trapezoid distortion is corrected completely.

Thereby, there can be provided a two-dimensional image displaying apparatus which can substantially completely correct the image distortion such as the TV distortion and trapezoid distortion which has heretofore posed a problem by deteriorating the quality of image, by the two-dimensional scanning optical system, and can always obtain an image of high quality.

While in the present embodiment, the surfaces monotonously changing in the curvature of the sagittal line are formed on two surfaces, i.e., the emergence surface of the second scanning lens 5b and the incidence surface of the third scanning lens 5c, this is not restrictive, but such surfaces can be formed on one or more surfaces.

(Color Image Forming Apparatus)

Figure 20:
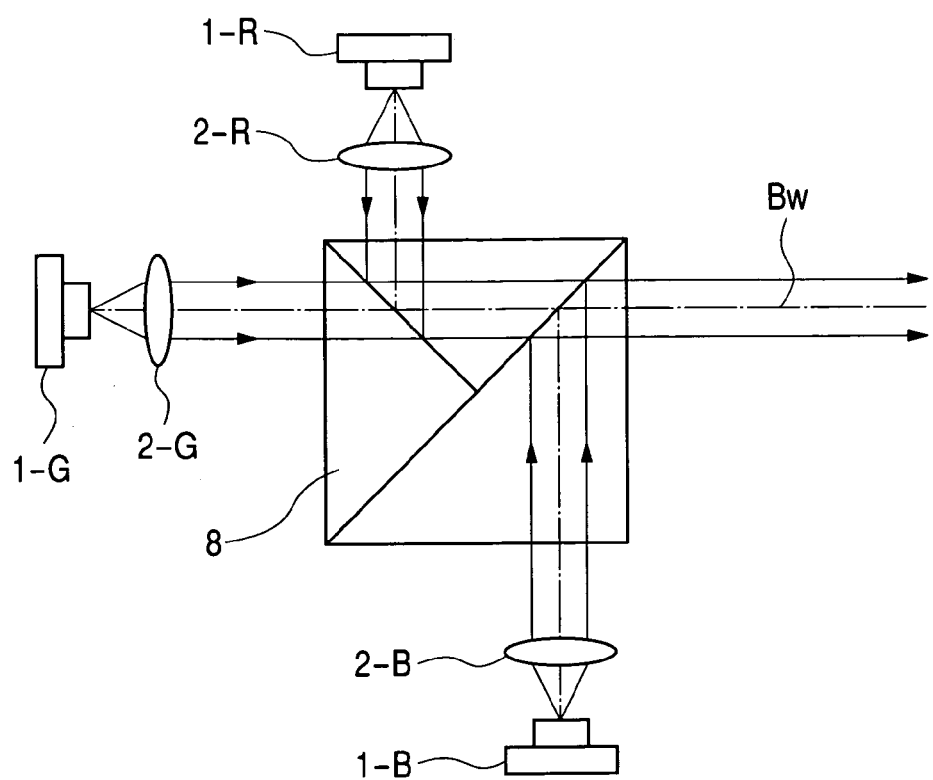
FIG. 20 is a schematic view of the essential portions of the three-color light sources for color displaying of the present invention.

The present invention may also be used as a scanning type color image displaying apparatus in which the light source means in each of the first, second and third embodiments of the present invention is made into light sources of three colors, for example, red 1-R, green 1-G and blue 1-B as shown in FIG. 20, and beams emitted from the respective light-emitting points of the light sources of three colors, i.e., 1-R, 1-G and 1-B are converted into parallel beams by corresponding collimator lenses 2-R, 2-G and 2-B, and are combined by color combining means such as a dichroic prism 8 to thereby form a white beam Bw, and this white beam is caused to enter deflecting means, not shown, and is two-dimensionally deflected thereby, and a two-dimensional color image is displayed on a screen by the use of the two-dimensional scanning apparatus of the present invention.

The two-dimensional scanning apparatus according to each of the first, second and third embodiments of the present invention is such that chromatic aberration of magnification is well corrected in each of red, green and blue color lights, and is made to correspond to the scanning type color image displaying apparatus.

Figure 21:
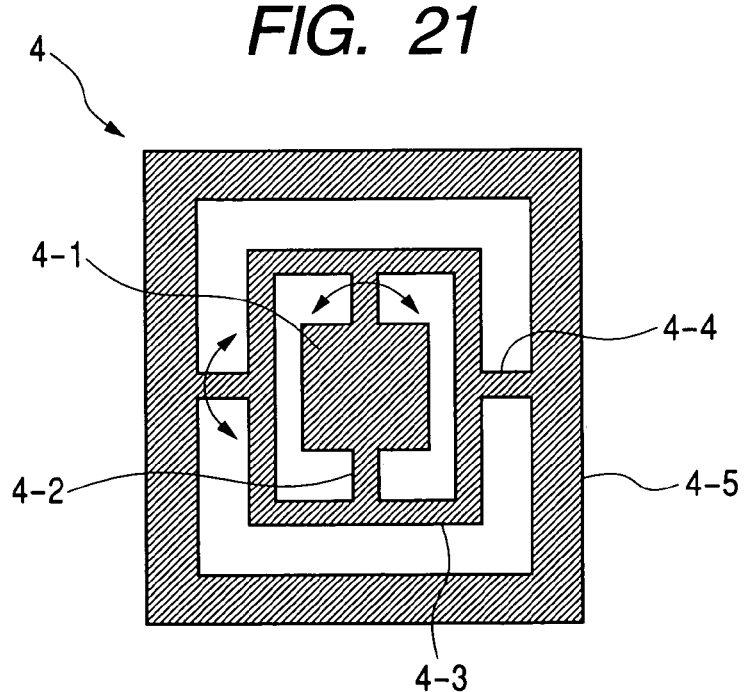
FIG. 21 is a schematic view of the essential portions of the MEMS device of the present invention resonatable in a two-dimensional direction.

Also, while in each of the first, second and third embodiments, two deflectors capable of deflecting the beam in a one-dimensional direction are combined together to thereby constitute the deflecting means 4, this is not restrictive, but the effect of the present invention can also be obtained when use is made of an MEMS device resonatable in a two-dimensional direction as shown, for example, in FIG. 21. At this time, the absolute value of the radius of curvature of the anamorphic surface monotonously changing in the radius of curvature can be set so as to change in a direction in which the beam is obliquely incident on a reflecting surface 4-1.

In FIG. 21, the reference numeral 4 designates deflecting means, the reference numeral 4-1 denotes a reflecting surface, the reference numeral 4-2 designates a torsion bar, the reference numeral 4-3 denotes a housing, the reference numeral 4-4 designates a torsion bar, and the reference numeral 4-5 denotes a housing.

Fourth Embodiment

Figure 22:
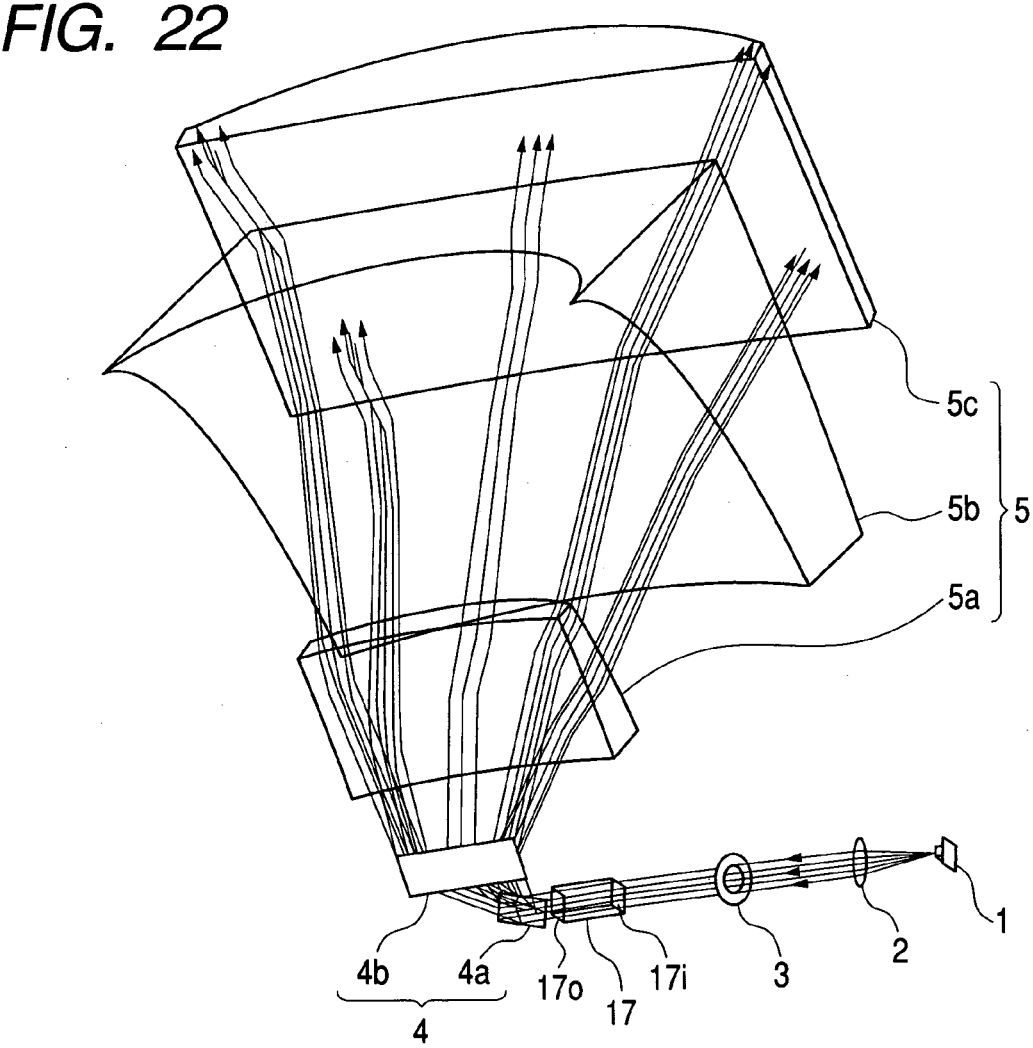
FIG. 22 is a schematic view of the essential portions of a two-dimensional scanning apparatus according to a fourth embodiment of the present invention.

FIG. 22 is a schematic view of the essential portions of a two-dimensional scanning apparatus according to a fourth embodiment of the present invention. In FIG. 22, the same elements as the elements shown in FIG. 1 are given the same reference characters.

The differences of this embodiment from the aforedescribed first embodiment are that an anamorphic lens is used in an anamorphic incidence optical system 17, and that in accordance therewith, the lens shape of each scanning lens constituting a scanning optical system 5 is changed. In the other points, the construction and optical action of the present embodiment are substantially same as those of the first embodiment, whereby a similar effect can be obtained.

That is, in FIG. 22, the reference numeral 17 designates an anamorphic incidence optical system having an anamorphic lens which has negative optical power in the horizontal direction (X-axis direction) and positive optical power in the vertical direction (Y-axis direction). The anamorphic incidence optical system 17 may be constituted by a plurality of anamorphic lenses, or may be combined with other lens. The reference numeral 5 denotes a two-dimensional scanning optical system as scanning optical means having three first, second and third scanning lenses 5a, 5b and 5c, and it causes a beam two-dimensionally deflected by the deflecting means 4 to be imaged as a spot on a screen surface, not shown.

Table 8 below shows the configuration of the two-dimensional scanning optical apparatus according to the present embodiment.

TABLE 8

Configuration of Scanning Optical System

| Lens | Surface | Surface shape | Ry | Rx | Thickness | Nd | vd | Coordinates x | Coordinates y | Coordinates z | Inclination a | Inclination b | Inclination c |
|---|---|---|---|---|---|---|---|---|---|---|---|---|---|
| Anamorphic incidence optical system 7 | Incidence surface | Flat surface | Flat | Flat | 3.40 | 1.51633 | 64.1 | | | | | | |
| | Emergence surface | Anamorphic surface | −1106.415 | 79.679 | | | | | | | | | |
| 1st deflector 4a | Reflecting surface | Flat surface | Flat | Flat | | | | | | | | | |
| 2nd deflector 4b | Reflecting surface | Flat surface | Flat | Flat | | | | 0.00 | 0.00 | 0.00 | 17.87 | 0.00 | 0.00 |
| 1st scanning lens 5a | Incidence surface 5ai | Y toroidal surface | −140.438 | −24.819 | 5.00 | 1.83400 | 37.2 | 0.00 | −10.74 | 7.15 | 0.00 | 0.00 | 0.00 |
| | Emergence surface 5ao | Y toroidal surface | −61.864 | −17.063 | | | | 0.00 | −10.74 | 12.15 | 0.00 | 0.00 | 0.00 |
| 2nd scanning lens 5b | Incidence surface 5bi | Y toroidal surface | −93.563 | −27.063 | 2.00 | 1.83400 | 37.2 | 0.00 | −24.26 | 26.92 | −3.83 | 0.00 | 0.00 |
| | Emergence surface 5bo | Spherical surface | −184.103 | −184.103 | | | | 0.00 | −24.40 | 28.92 | −3.83 | 0.00 | 0.00 |
| 3rd scanning lens 5c | Incidence surface 5ci | Spherical surface | −198.127 | −198.127 | 5.00 | 1.48749 | 70.2 | 0.00 | 19.00 | 29.50 | 10.75 | 0.00 | 0.00 |
| | Emergence surface 5co | Cylindrical surface | Flat | −31.024 | | | | 0.00 | 19.93 | 34.41 | 10.75 | 0.00 | 0.00 |
| Surface to be scanned 6 | | Flat surface | Flat | Flat | Flat | | | 0.00 | 276.02 | 386.55 | 35.74 | 0.00 | 0.00 |

Description will now be made of the anamorphic incidence optical system 17 in the present embodiment.

The anamorphic incidence optical system 17 is composed of an anamorphic lens which has negative optical power in the horizontal direction (X-axis direction), and positive optical power in the vertical direction (Y-axis direction), the incidence surface 17i is a flat surface, the emergence surface 17o is an anamorphic surface having a concave surface in the horizontal direction and a convex surface in the vertical direction.

This anamorphic incidence optical system 17 converts a parallel beam from the light source means 1 into a divergent beam in the horizontal direction, and converts it into a convergent beam in the vertical direction.

Figure 23:
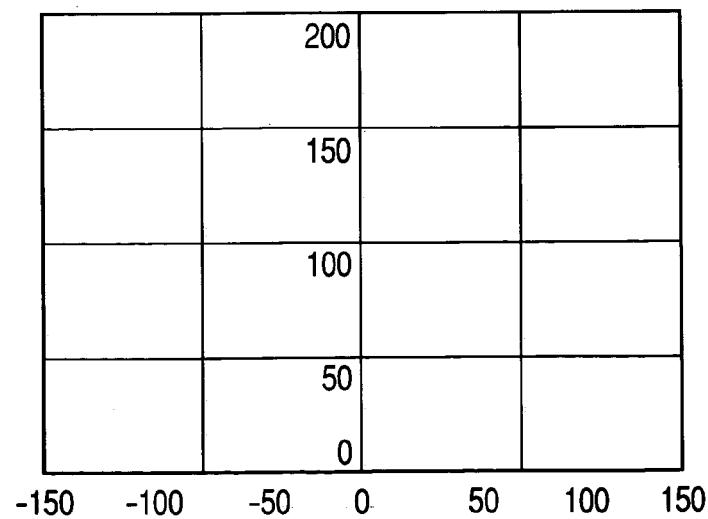
FIG. 23 shows a scanning image (grating) in the fourth embodiment of the present invention.

FIG. 23 shows a scanning image (grating) in the two-dimensional scanning apparatus according to the present embodiment. Table 9 below shows the values of TV distortion and trapezoid distortion.

TABLE 9

|  | TV distortion | Trapezoid distortion |  |
| --- | --- | --- | --- |
| Upper side | 0.02 | 0.00 | (%) |
| Lower side | 0.06 | 0.00 | (%) |
| Left side | 0.14 | 0.20 | (%) |
| Right side | 0.14 | 0.20 | (%) |

In the two-dimensional scanning apparatus according to the present embodiment, the TV distortion is 0.02% on the upper side L1, 0.06% on the lower side L2, 0.14% on the left side L3, and 0.14% on the right side L4, and as compared with the aforedescribed first embodiment, the TV distortion is corrected better. Also, the trapezoid distortion is 0.00% on both of the upper side L1 and the lower side L2, and is 0.20% on both of the left side L3 and the right side L4, and the trapezoid distortion is corrected well.

By disposing the anamorphic incidence optical system 17 between the light source means 1 and the second deflector 4b as described above, the effect of correcting the image distortion such as the TV distortion caused by the two-dimensional scanning optical system and the trapezoid distortion can be improved, and there can be provided a two-dimensional scanning apparatus with less image distortion.

Further, there will be obtained a great effect if the optical power of the anamorphic incidence optical system 17 in the horizontal direction (X-axis direction) is set so as to be weaker than the optical power thereof in the vertical direction (Y-axis direction).

While in the present embodiment, the anamorphic incidence optical system 17 has negative optical power in the horizontal direction and positive optical power in the vertical direction, this is not restrictive, but an effect equal to that of the present invention can be obtained even if, for example, the anamorphic incidence optical system 17 in the horizontal direction has positive optical power weaker than that in the vertical direction. Also, while in the present embodiment, an anamorphic lens is used as the anamorphic incidence optical system, this is not restrictive, but an effect equal to that of the present invention can be obtained even if, for example, an anamorphic mirror is used.

While in each of the first to fourth embodiments, the two-dimensional scanning optical system is composed of three scanning lenses, this is not restrictive, but for example, it may be composed of one, or two, or four or more scanning lenses. In this case, anamorphic surfaces monotonously changing in the radius of curvature can be provided on one or more surfaces of one or more scanning lenses to thereby configure the two-dimensional scanning optical system. Also, the two-dimensional scanning optical system may be configured to contain a diffraction optical element therein.

This application claims priority from Japanese Patent Application No. 2003-397677 filed Nov. 27, 2003, which is hereby incorporated by reference herein.

What is claimed is:

1. A two-dimensional scanning apparatus comprising:
light source means,
deflecting means for deflecting a beam emitted from the light source means in a two-dimensional direction, and
scanning optical means for directing the beam deflected by the deflecting means onto a surface to be scanned,
wherein the scanning optical means has at least one scanning optical element, at least one of optical surfaces of the at least one scanning optical element is an anamorphic surface, and the anamorphic surface is an anamorphic surface of which the absolute value of a radius of curvature in a first direction continuously decreases from one side toward the other side along a second direction orthogonal to the first direction.

2. A two dimensional scanning apparatus according to claim 1, wherein let θvi be an angle in the second direction at which every beam deflected by the deflecting means is incident on the surface to be scanned, θvi is 0 degree.

3. A two-dimensional scanning apparatus according to claim 1, wherein in the second direction, the angle at which a beam passed through a portion of the scanning optical element having the anamorphic surface in which the absolute value of the radius of curvature in the first direction is small is incident on the surface to be scanned is greater than the angle at which a beam passed through a portion thereof in which the absolute value of the radius of curvature is great is incident on the surface to be scanned.

4. A two-dimensional scanning apparatus according to claim 1,
wherein the at least one scanning optical element has a plurality of the anamorphic surfaces, at least one of the plurality of anamorphic surfaces has positive refractive power, at least one of the plurality of anamorphic surfaces has negative refractive power, and
wherein a side of the anamorphic surface having positive refractive power on which the absolute value of the radius of curvature in the first direction is small and a side of the anamorphic surface having negative refractive power on which the absolute value of the radius of curvature in the first direction is small are made coincident with each other.

5. A two-dimensional scanning apparatus according to claim 1, wherein the at least one scanning optical element is a meniscus lens having the anamorphic surface on an incidence surface or/and an emergence surface thereof, and having its concave surface facing the deflecting means side.

6. A two-dimensional scanning apparatus according to claim 1, wherein the at least one scanning optical element has an anamorphic surface of which the absolute value of the radius of curvature in the second direction is greater than the absolute value of the radius of curvature in the first direction.

7. A two-dimensional scanning apparatus according to claim 1, wherein the at least one scanning optical element has a barrel-shaped toric surface.

8. A two-dimensional scanning apparatus according to claim 1, wherein the anamorphic incidence optical system has an anamorphic lens having negative refractive power in the first direction and positive refractive power in the second direction.

9. A scanning type image displaying apparatus provided with a two-dimensional scanning apparatus according to any one of claims 1, 2, 3, 4, or 8.

10. A scanning type color image displaying apparatus provided with light sources of three colors as light source means in a two-dimensional scanning apparatus according to any one of claims 1, 2, 3, 4 to 7, or 8.

* * * * *

UNITED STATES PATENT AND TRADEMARK OFFICE
CERTIFICATE OF CORRECTION

PATENT NO. : 7,256,917 B2
APPLICATION NO. : 10/991376
DATED : August 14, 2007
INVENTOR(S) : Keiichiro Ishihara It is certified that error appears in the above-identified patent and that said Letters Patent is hereby corrected as shown below:

TITLE PAGE, ITEM 57 IN THE ABSTRACT
    Line 7, "element," should read --elements,--.

COLUMN 7
    Line 11, "means 1is" should read --means 1 is--.

COLUMN 8
    Line 48, "(#0" should read --($\neq$ 0--.

COLUMN 14
    Line 10, "is weaker in" should be deleted; and
    Line 14, "means 1into" should read --means 1 into--.

COLUMN 24
    Line 20, "lens." should read --lenses.--.

COLUMN 26
    Line 61, "claims 1, 2, 3, 4 or 8" should read --claims 1 to 8--; and
    Line 64, "claims 1, 2, 3, 4 or 8" should read --claims 1 to 8--.

Signed and Sealed this

First Day of June, 2010

David J. Kappos
*Director of the United States Patent and Trademark Office*